United States Patent
Kuo et al.

(10) Patent No.: US 11,106,954 B2
(45) Date of Patent: *Aug. 31, 2021

(54) CORRECTING IN-TRACK ERRORS IN A LINEAR PRINTHEAD

(71) Applicant: Eastman Kodak Company, Rochester, NY (US)

(72) Inventors: Chung-Hui Kuo, Fairport, NY (US); Brian B. Mix, Churchville, NY (US); Michael Thomas Dobbertin, Honeoye, NY (US)

(73) Assignee: EASTMAN KODAK COMPANY, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/564,235

(22) Filed: Sep. 9, 2019

(65) Prior Publication Data

US 2021/0073601 A1    Mar. 11, 2021

(51) Int. Cl.
*G06K 15/02*    (2006.01)
*B41J 2/525*    (2006.01)
(Continued)

(52) U.S. Cl.
CPC ............ *G06K 15/1247* (2013.01); *B41J 2/45* (2013.01); *B41J 2/525* (2013.01); *G06K 15/027* (2013.01); *G06K 15/129* (2013.01); *G06K 15/1825* (2013.01); *G06T 7/001* (2013.01); *G06T 7/74* (2017.01); *H04N 1/00015* (2013.01); *H04N 1/00023* (2013.01); *H04N 1/00031* (2013.01); *H04N 1/00034* (2013.01); *H04N 1/00039* (2013.01); *H04N 1/00045* (2013.01); *H04N 1/00068* (2013.01); *H04N 1/00082* (2013.01); *H04N 1/00718* (2013.01); *H04N 1/053* (2013.01); *H04N 1/1008* (2013.01); *H04N 1/1931* (2013.01); *H04N 1/1934* (2013.01); *H04N 1/29* (2013.01); *H04N 1/3878* (2013.01);
(Continued)

(58) Field of Classification Search
CPC combination set(s) only.
See application file for complete search history.

(56) References Cited

U.S. PATENT DOCUMENTS 5,841,552 A    11/1998 Atobe et al.
6,008,826 A    12/1999 Foote et al.
(Continued)

*Primary Examiner* — Barbara D Reinier
(74) *Attorney, Agent, or Firm* — Kevin E. Spaulding; David A. Novais

(57) ABSTRACT

A method for correcting in-track position errors in a digital printing system having a linear printhead includes printing a test target including a plurality of alignment marks. A data processing system is used to automatically analyze a captured image of the printed test target to determine a measured in-track position for each of the alignment marks. The measured in-track positions for the alignment marks are compared to reference positions to determine measured in-track position errors. An in-track position correction function is determined responsive to the measured in-track position errors, wherein the in-track position correction function specifies in-track position corrections to be applied as a function of cross-track position. A corrected digital image is determined by resampling an input digital image responsive to the in-track position correction function.

11 Claims, 22 Drawing Sheets

(51) Int. Cl.

| | |
|---|---|
| *G06K 15/12* | (2006.01) |
| *B41J 2/45* | (2006.01) |
| *G06T 7/73* | (2017.01) |
| *G06T 7/00* | (2017.01) |
| *H04N 1/00* | (2006.01) |
| *H04N 1/10* | (2006.01) |
| *H04N 1/193* | (2006.01) |
| *H04N 1/58* | (2006.01) |
| *H04N 1/60* | (2006.01) |
| *H04N 1/29* | (2006.01) |
| *H04N 1/387* | (2006.01) |
| *H04N 1/50* | (2006.01) |
| *H04N 1/053* | (2006.01) |
| *B41J 29/393* | (2006.01) |

(52) U.S. Cl.
CPC ............... *H04N 1/504* (2013.01); *H04N 1/58* (2013.01); *H04N 1/6033* (2013.01); *B41J 2029/3935* (2013.01); *G06T 2207/10024* (2013.01); *G06T 2207/30144* (2013.01); *H04N 2201/04717* (2013.01); *H04N 2201/04731* (2013.01); *H04N 2201/04791* (2013.01); *H04N 2201/04793* (2013.01)

(56) References Cited

U.S. PATENT DOCUMENTS

| | | | |
|---|---|---|---|
| 6,086,441 | A | 7/2000 | Akiguchi et al. |
| 6,333,792 | B1 | 12/2001 | Kimura |
| 6,452,696 | B1 | 9/2002 | Bogart et al. |
| 6,554,388 | B1 | 4/2003 | Wong et al. |
| 7,038,816 | B2 | 5/2006 | Klassen et al. |
| 7,058,325 | B2 | 6/2006 | Hamby et al. |
| 7,079,281 | B1 | 7/2006 | Ng et al. |
| 7,079,287 | B1 | 7/2006 | Ng et al. |
| 7,218,420 | B1 | 5/2007 | Tai et al. |
| 7,564,475 | B1 | 7/2009 | Mizes |
| 7,626,730 | B2 | 12/2009 | Tai et al. |
| 7,663,654 | B2 | 2/2010 | Arai et al. |
| 7,830,569 | B2 | 11/2010 | Tai et al. |
| 8,493,623 | B2 | 7/2013 | Tai et al. |
| 8,520,044 | B2 | 8/2013 | Tewinkle |
| 8,559,061 | B2 | 10/2013 | Dobbertin et al. |
| 8,824,907 | B2 | 9/2014 | Kuo et al. |
| 8,842,330 | B1 * | 9/2014 | Enge ..................... B41J 2/2146 358/1.8 |
| 8,842,331 | B1 * | 9/2014 | Enge ..................... B41J 2/2135 358/1.8 |
| 9,030,516 | B2 | 5/2015 | Munechika et al. |
| 9,147,232 | B1 | 9/2015 | Kuo |
| 9,250,595 | B1 | 2/2016 | Sreekumar et al. |
| 9,565,337 | B1 | 2/2017 | Kuo et al. |
| 9,712,712 | B1 * | 7/2017 | Kuo .......................... B41J 2/45 |
| 10,062,017 | B2 | 8/2018 | Kuo et al. |
| 10,126,696 | B1 | 11/2018 | Kuo et al. |
| 10,192,150 | B2 | 1/2019 | Kuo et al. |
| 2005/0036705 | A1 | 2/2005 | Viassolo et al. |
| 2005/0134624 | A1 | 6/2005 | Mizes |
| 2006/0133870 | A1 | 6/2006 | Ng et al. |
| 2007/0211913 | A1 | 9/2007 | Washio et al. |
| 2007/0229894 | A1 | 10/2007 | Siemens et al. |
| 2008/0144076 | A1 | 6/2008 | Boliek et al. |
| 2008/0226361 | A1 | 9/2008 | Tomita et al. |
| 2010/0097657 | A1 | 4/2010 | Tai et al. |
| 2010/0245519 | A1 * | 9/2010 | Johnston ................ G03G 15/50 347/116 |
| 2014/0063099 | A1 | 3/2014 | Enge et al. |
| 2015/0116408 | A1 * | 4/2015 | Armbruster ........... B41J 2/2135 347/15 |

* cited by examiner

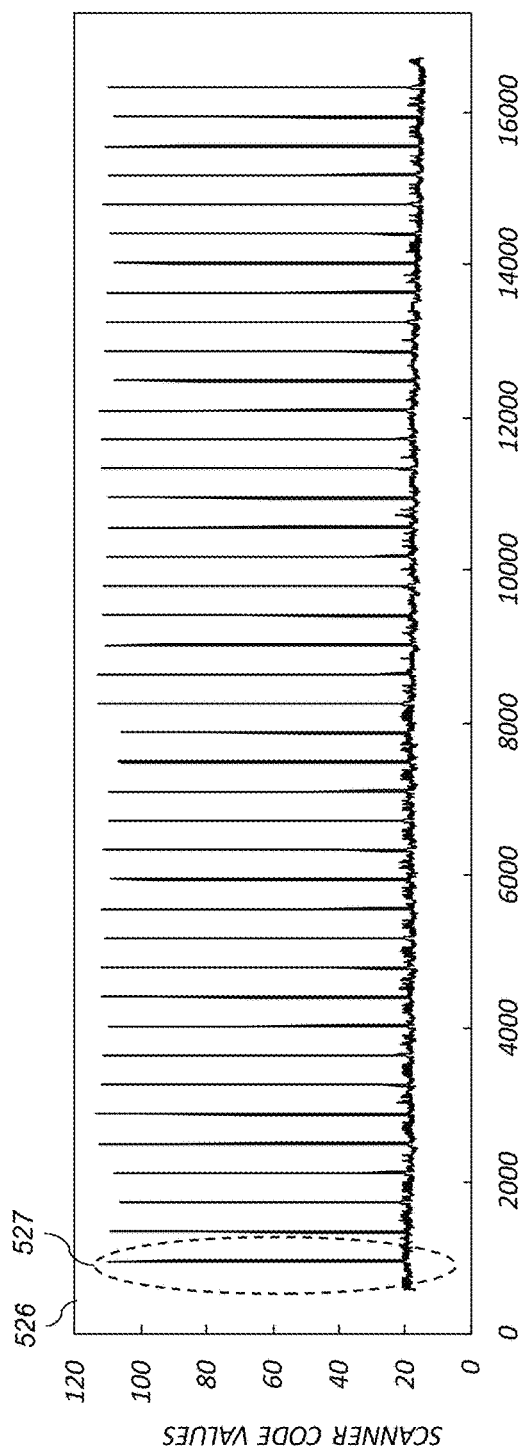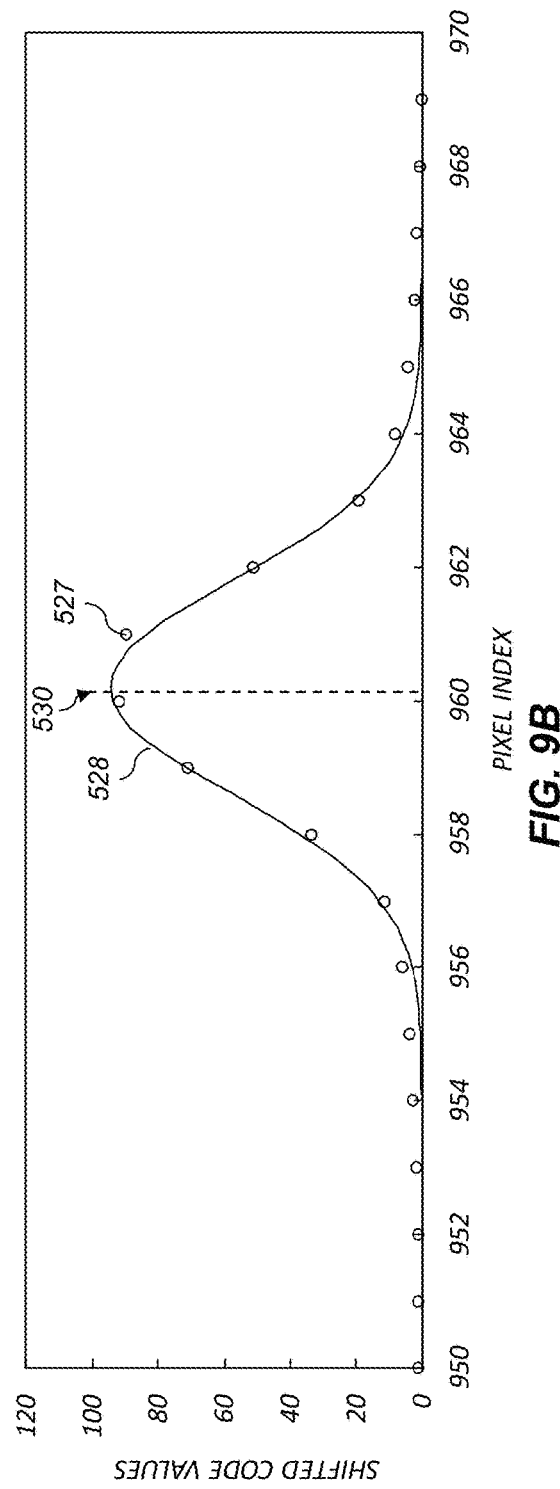

CORRECTING IN-TRACK ERRORS IN A LINEAR PRINTHEAD

CROSS-REFERENCE TO RELATED APPLICATIONS

Reference is made to commonly assigned, co-pending U.S. patent application Ser. No. 16/417,731, entitled: "Correcting cross-track errors in a linear printhead", by Kuo et al.; to commonly assigned, co-pending U.S. patent application Ser. No. 16/417,763, entitled: "Printer with cross-track position error correction", by Kuo et al.; and to commonly assigned, co-pending U.S. patent application Ser. No. 16/564,255, entitled: "Printer with in-track position error correction", by Kuo et al., each of which is incorporated herein by reference.

FIELD OF THE INVENTION

This invention pertains to the field of digital printing, and more particularly to a method for calibrating a printer including a linear printhead to compensate for in-track registration errors.

BACKGROUND OF THE INVENTION

Electrophotography is a useful process for printing images on a receiver (or "imaging substrate"), such as a piece or sheet of paper or another planar medium (e.g., glass, fabric, metal, or other objects) as will be described below. In this process, an electrostatic latent image is formed on a photoreceptor by uniformly charging the photoreceptor and then discharging selected areas of the uniform charge to yield an electrostatic charge pattern corresponding to the desired image (i.e., a "latent image").

After the latent image is formed, charged toner particles are brought into the vicinity of the photoreceptor and are attracted to the latent image to develop the latent image into a toner image. Note that the toner image may not be visible to the naked eye depending on the composition of the toner particles (e.g., clear toner).

After the latent image is developed into a toner image on the photoreceptor, a suitable receiver is brought into juxtaposition with the toner image. A suitable electric field is applied to transfer the toner particles of the toner image to the receiver to form the desired print image on the receiver. The imaging process is typically repeated many times with reusable photoreceptors.

The receiver is then removed from its operative association with the photoreceptor and subjected to heat or pressure to permanently fix (i.e., "fuse") the print image to the receiver. Plural print images (e.g., separation images of different colors) can be overlaid on the receiver before fusing to form a multi-color print image on the receiver.

In-track position errors in digital printing systems having linear printheads can result in objectionable in-track alignment errors between color channels. Therefore, there remains a need for a method to characterize and correct for the in-track position errors that can be implemented without the need for complex and costly fixtures.

SUMMARY OF THE INVENTION

The present invention represents a method for correcting in-track position errors in a digital printing system having a linear printhead, the linear printhead extending in a cross-track direction and including an array of light sources for exposing a photosensitive medium, including:

a) providing digital image data for a test target including a plurality of alignment marks positioned at predefined cross-track positions;

b) printing the test target using the digital printing system to provide a printed test target;

c) using a digital image capture system to capture an image of the printed test target;

d) using a data processing system to automatically analyze the captured image to determine a measured in-track position for each of the alignment marks;

e) comparing the measured in-track positions for the alignment marks to reference in-track positions to determine measured in-track position errors;

f) determining an in-track position correction function responsive to the measured in-track position errors, wherein the in-track position correction function specifies in-track position corrections to be applied as a function of cross-track position;

g) storing a representation of the in-track position correction function in a digital memory;

h) receiving digital image data for a digital image to be printed by the digital imaging system, wherein the digital image includes a plurality of image lines extending in the cross-track direction;

i) determining corrected image lines by resampling the digital image data responsive to the stored representation of the in-track position correction function; and j) printing the corrected image lines using the digital printing system to provide a printed image with reduced in-track position errors.

This invention has the advantage that in-track alignment errors are reduced in a digital printing system.

It has the additional advantage that the in-track position correction function can be determined using a simple process that includes printing and scanning a test target including a plurality of alignment marks.

It has the further advantage that the in-track position corrections can be non-linear to account for localized in-track alignment error characteristics.

BRIEF DESCRIPTION OF THE DRAWINGS

FIGS. 9A-9B illustrate the determination of measured alignment mark positions from a combined image trace;

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

Figure 1:
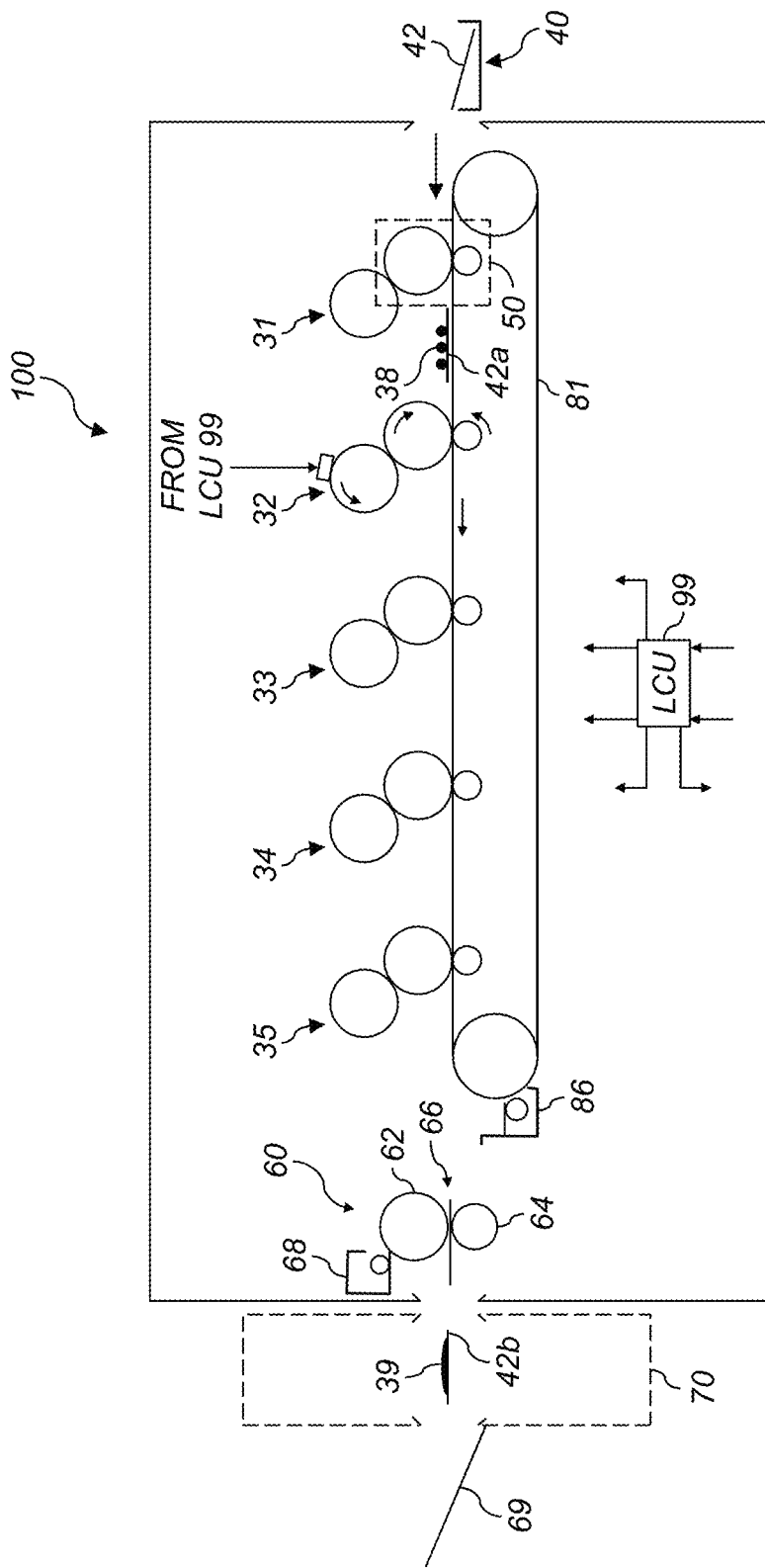
FIG. 1 is an elevational cross-section of an electrophotographic printer suitable for use with various embodiments.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated, or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

As used herein, the terms "parallel" and "perpendicular" have a tolerance of ±10°.

As used herein, "sheet" is a discrete piece of media, such as receiver media for an electrophotographic printer (described below). Sheets have a length and a width. Sheets are folded along fold axes (e.g., positioned in the center of the sheet in the length dimension, and extending the full width of the sheet). The folded sheet contains two "leaves," each leaf being that portion of the sheet on one side of the fold axis. The two sides of each leaf are referred to as "pages." "Face" refers to one side of the sheet, whether before or after folding.

As used herein, "toner particles" are particles of one or more material(s) that are transferred by an electrophotographic (EP) printer to a receiver to produce a desired effect or structure (e.g., a print image, texture, pattern, or coating) on the receiver. Toner particles can be ground from larger solids, or chemically prepared (e.g., precipitated from a solution of a pigment and a dispersant using an organic solvent), as is known in the art. Toner particles can have a range of diameters (e.g., less than 8 µm, on the order of 10-15 µm, up to approximately 30 µm, or larger), where "diameter" preferably refers to the volume-weighted median diameter, as determined by a device such as a Coulter Multisizer. When practicing this invention, it is preferable to use larger toner particles (i.e., those having diameters of at least 20 µm) in order to obtain the desirable toner stack heights that would enable macroscopic toner relief structures to be formed.

"Toner" refers to a material or mixture that contains toner particles, and that can be used to form an image, pattern, or coating when deposited on an imaging member including a photoreceptor, a photoconductor, or an electrostatically-charged or magnetic surface. Toner can be transferred from the imaging member to a receiver. Toner is also referred to in the art as marking particles, dry ink, or developer, but note that herein "developer" is used differently, as described below. Toner can be a dry mixture of particles or a suspension of particles in a liquid toner base.

As mentioned already, toner includes toner particles; it can also include other types of particles. The particles in toner can be of various types and have various properties. Such properties can include absorption of incident electromagnetic radiation (e.g., particles containing colorants such as dyes or pigments), absorption of moisture or gasses (e.g., desiccants or getters), suppression of bacterial growth (e.g., biocides, particularly useful in liquid-toner systems), adhesion to the receiver (e.g., binders), electrical conductivity or low magnetic reluctance (e.g., metal particles), electrical resistivity, texture, gloss, magnetic remanence, florescence, resistance to etchants, and other properties of additives known in the art.

In single-component or mono-component development systems, "developer" refers to toner alone. In these systems, none, some, or all of the particles in the toner can themselves be magnetic. However, developer in a mono-component system does not include magnetic carrier particles. In dual-component, two-component, or multi-component development systems, "developer" refers to a mixture including toner particles and magnetic carrier particles, which can be electrically-conductive or -non-conductive. Toner particles can be magnetic or non-magnetic. The carrier particles can be larger than the toner particles (e.g., 15-20 µm or 20-300 µm in diameter). A magnetic field is used to move the developer in these systems by exerting a force on the magnetic carrier particles. The developer is moved into proximity with an imaging member or transfer member by the magnetic field, and the toner or toner particles in the developer are transferred from the developer to the member by an electric field, as will be described further below. The magnetic carrier particles are not intentionally deposited on the member by action of the electric field; only the toner is intentionally deposited. However, magnetic carrier particles, and other particles in the toner or developer, can be unintentionally transferred to an imaging member. Developer can include other additives known in the art, such as those listed above for toner. Toner and carrier particles can be substantially spherical or non-spherical.

The electrophotographic process can be embodied in devices including printers, copiers, scanners, and facsimiles, and analog or digital devices, all of which are referred to herein as "printers." Various embodiments described herein are useful with electrostatographic printers such as electrophotographic printers that employ toner developed on an electrophotographic receiver, and ionographic printers and copiers that do not rely upon an electrophotographic receiver. Electrophotography and ionography are types of electrostatography (printing using electrostatic fields), which is a subset of electrography (printing using electric fields). The present invention can be practiced using any type of electrographic printing system, including electrophotographic and ionographic printers.

A digital reproduction printing system ("printer") typically includes a digital front-end processor (DFE), a print engine (also referred to in the art as a "marking engine") for applying toner to the receiver, and one or more post-printing finishing system(s) (e.g., a UV coating system, a glosser system, or a laminator system). A printer can reproduce pleasing black-and-white or color images onto a receiver. A printer can also produce selected patterns of toner on a receiver, which patterns (e.g., surface textures) do not correspond directly to a visible image.

In an embodiment of an electrophotographic modular printing machine useful with various embodiments (e.g., the NEXPRESS SX 3900 printer manufactured by Eastman Kodak Company of Rochester, N.Y.) color-toner print images are made in a plurality of color imaging modules arranged in tandem, and the print images are successively electrostatically transferred to a receiver adhered to a transport web moving through the modules. Colored toners include colorants, (e.g., dyes or pigments) which absorb specific wavelengths of visible light. Commercial machines of this type typically employ intermediate transfer members in the respective modules for transferring visible images from the photoreceptor and transferring print images to the receiver. In other electrophotographic printers, each visible image is directly transferred to a receiver to form the corresponding print image.

Electrophotographic printers having the capability to also deposit clear toner using an additional imaging module are also known. The provision of a clear-toner overcoat to a color print is desirable for providing features such as protecting the print from fingerprints, reducing certain visual artifacts or providing desired texture or surface finish characteristics. Clear toner uses particles that are similar to the toner particles of the color development stations but without colored material (e.g., dye or pigment) incorporated into the toner particles. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective color toners are deposited one upon the other at respective locations on the receiver and the height of a respective color toner stack is the sum of the toner heights of each respective color. Uniform stack height provides the print with a more even or uniform gloss.

Figure 2:
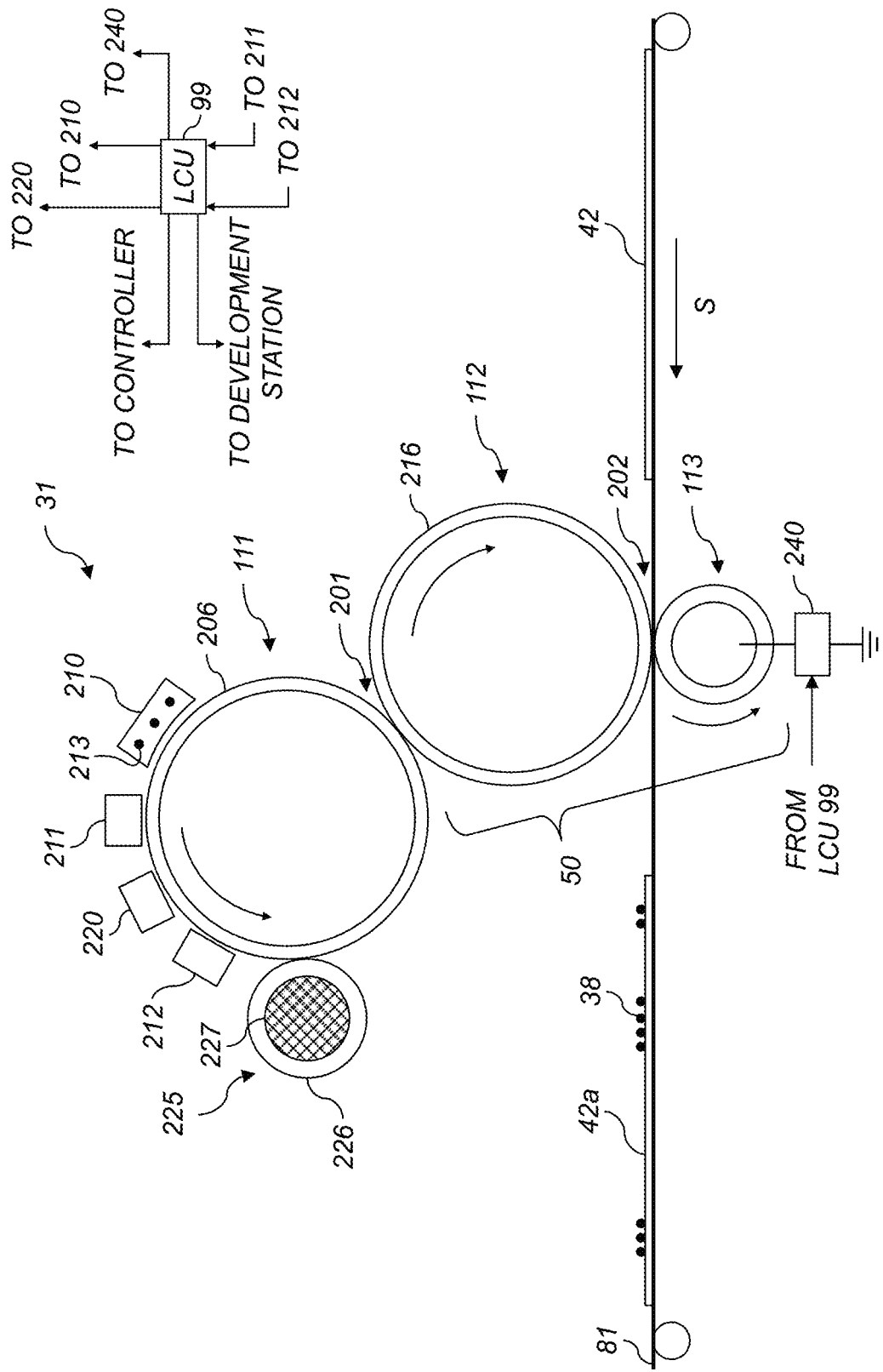
FIG. 2 is an elevational cross-section of one printing subsystem of the electrophotographic printer of FIG. 1.

FIGS. 1-2 are elevational cross-sections showing portions of a typical electrophotographic printer 100 useful with various embodiments. Printer 100 is adapted to produce images, such as single-color images (i.e., monochrome images), or multicolor images such as CMYK, or pentachrome (five-color) images, on a receiver. Multicolor images are also known as "multi-component" images. One embodiment involves printing using an electrophotographic print engine having five sets of single-color image-producing or image-printing stations or modules arranged in tandem, but more or less than five colors can be combined on a single receiver. Other electrophotographic writers or printer apparatus can also be included. Various components of printer 100 are shown as rollers; other configurations are also possible, including belts.

Referring to FIG. 1, printer 100 is an electrophotographic printing apparatus having a number of tandemly-arranged electrophotographic image-forming printing subsystems 31, 32, 33, 34, 35, also known as electrophotographic imaging subsystems. Each printing subsystem 31, 32, 33, 34, 35 produces a single-color toner image for transfer using a respective transfer subsystem 50 (for clarity, only one is labeled) to a receiver 42 successively moved through the modules. In some embodiments one or more of the printing subsystem 31, 32, 33, 34, 35 can print a colorless toner image, which can be used to provide a protective overcoat or tactile image features. Receiver 42 is transported from supply unit 40, which can include active feeding subsystems as known in the art, into printer 100 using a transport web 81. In various embodiments, the visible image can be transferred directly from an imaging roller to a receiver, or from an imaging roller to one or more transfer roller(s) or belt(s) in sequence in transfer subsystem 50, and then to receiver 42. Receiver 42 is, for example, a selected section of a web or a cut sheet of a planar receiver media such as paper or transparency film.

In the illustrated embodiments, each receiver 42 can have up to five single-color toner images transferred in registration thereon during a single pass through the five printing subsystems 31, 32, 33, 34, 35 to form a pentachrome image. As used herein, the term "pentachrome" implies that in a print image, combinations of various of the five colors are combined to form other colors on the receiver at various locations on the receiver, and that all five colors participate to form process colors in at least some of the subsets. That is, each of the five colors of toner can be combined with toner of one or more of the other colors at a particular location on the receiver to form a color different than the colors of the toners combined at that location. In an exemplary embodiment, printing subsystem 31 forms black (K) print images, printing subsystem 32 forms yellow (Y) print images, printing subsystem 33 forms magenta (M) print images, and printing subsystem 34 forms cyan (C) print images.

Printing subsystem 35 can form a red, blue, green, or other fifth print image, including an image formed from a clear toner (e.g., one lacking pigment). The four subtractive primary colors, cyan, magenta, yellow, and black, can be combined in various combinations of subsets thereof to form a representative spectrum of colors. The color gamut of a printer (i.e., the range of colors that can be produced by the printer) is dependent upon the materials used and the process used for forming the colors. The fifth color can therefore be added to improve the color gamut. In addition to adding to the color gamut, the fifth color can also be a specialty color toner or spot color, such as for making proprietary logos or colors that cannot be produced with only CMYK colors (e.g., metallic, fluorescent, or pearlescent colors), or a clear toner or tinted toner. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

Receiver 42a is shown after passing through printing subsystem 31. Print image 38 on receiver 42a includes unfused toner particles. Subsequent to transfer of the respective print images, overlaid in registration, one from each of the respective printing subsystems 31, 32, 33, 34, 35, receiver 42a is advanced to a fuser module 60 (i.e., a fusing or fixing assembly) to fuse the print image 38 to the receiver 42a. Transport web 81 transports the print-image-carrying receivers to the fuser module 60, which fixes the toner particles to the respective receivers, generally by the application of heat and pressure. The receivers are serially de-tacked from the transport web 81 to permit them to feed cleanly into the fuser module 60. The transport web 81 is then reconditioned for reuse at cleaning station 86 by cleaning and neutralizing the charges on the opposed surfaces of the transport web 81. A mechanical cleaning station (not shown) for scraping or vacuuming toner off transport web 81 can also be used independently or with cleaning station 86. The mechanical cleaning station can be disposed along the transport web 81 before or after cleaning station 86 in the direction of rotation of transport web 81.

In the illustrated embodiment, the fuser module 60 includes a heated fusing roller 62 and an opposing pressure roller 64 that form a fusing nip 66 therebetween. In an embodiment, fuser module 60 also includes a release fluid application substation 68 that applies release fluid, e.g., silicone oil, to fusing roller 62. Alternatively, wax-containing toner can be used without applying release fluid to the fusing roller 62. Other embodiments of fusers, both contact and non-contact, can be employed. For example, solvent fixing uses solvents to soften the toner particles so they bond with the receiver. Photoflash fusing uses short bursts of high-frequency electromagnetic radiation (e.g., ultraviolet light) to melt the toner. Radiant fixing uses lower-frequency electromagnetic radiation (e.g., infrared light) to more slowly melt the toner. Microwave fixing uses electromagnetic radiation in the microwave range to heat the receivers (primarily), thereby causing the toner particles to melt by heat conduction, so that the toner is fixed to the receiver.

The fused receivers (e.g., receiver 42b carrying fused image 39) are transported in series from the fuser module 60 along a path either to an output tray 69, or back to printing subsystems 31, 32, 33, 34, 35 to form an image on the backside of the receiver (i.e., to form a duplex print). Receivers 42b can also be transported to any suitable output accessory. For example, an auxiliary fuser or glossing assembly can provide a clear-toner overcoat. Printer 100 can also include multiple fuser modules 60 to support applications such as overprinting, as known in the art.

In various embodiments, between the fuser module 60 and the output tray 69, receiver 42b passes through a finisher 70. Finisher 70 performs various paper-handling operations, such as folding, stapling, saddle-stitching, collating, and binding.

Printer 100 includes main printer apparatus logic and control unit (LCU) 99, which receives input signals from various sensors associated with printer 100 and sends control signals to various components of printer 100. LCU 99 can include a microprocessor incorporating suitable look-up tables and control software executable by the LCU 99. It can also include a field-programmable gate array (FPGA), programmable logic device (PLD), programmable logic controller (PLC) (with a program in, e.g., ladder logic), microcontroller, or other digital control system. LCU 99 can include memory for storing control software and data. In some embodiments, sensors associated with the fuser module 60 provide appropriate signals to the LCU 99. In response to the sensor signals, the LCU 99 issues command and control signals that adjust the heat or pressure within fusing nip 66 and other operating parameters of fuser module 60. This permits printer 100 to print on receivers of various thicknesses and surface finishes, such as glossy or matte.

FIG. 2 shows additional details of printing subsystem 31, which is representative of printing subsystems 32, 33, 34, and 35 (FIG. 1). Photoreceptor 206 of imaging member 111 includes a photoconductive layer formed on an electrically conductive substrate. The photoconductive layer is an insulator in the substantial absence of light so that electric charges are retained on its surface. Upon exposure to light, the charge is dissipated. In various embodiments, photoreceptor 206 is part of, or disposed over, the surface of imaging member 111, which can be a plate, drum, or belt. Photoreceptors can include a homogeneous layer of a single material such as vitreous selenium or a composite layer containing a photoconductor and another material. Photoreceptors 206 can also contain multiple layers.

Charging subsystem 210 applies a uniform electrostatic charge to photoreceptor 206 of imaging member 111. In an exemplary embodiment, charging subsystem 210 includes a wire grid 213 having a selected voltage. Additional necessary components provided for control can be assembled about the various process elements of the respective printing subsystems. Meter 211 measures the uniform electrostatic charge provided by charging subsystem 210.

An exposure subsystem 220 is provided for selectively modulating the uniform electrostatic charge on photoreceptor 206 in an image-wise fashion by exposing photoreceptor 206 to electromagnetic radiation to form a latent electrostatic image. The uniformly-charged photoreceptor 206 is typically exposed to actinic radiation provided by selectively activating particular light sources in an LED array or a laser device outputting light directed onto photoreceptor 206. In embodiments using laser devices, a rotating polygon (not shown) is sometimes used to scan one or more laser beam(s) across the photoreceptor in the fast-scan direction. One pixel site is exposed at a time, and the intensity or duty cycle of the laser beam is varied at each dot site. In embodiments using an LED array, the array can include a plurality of LEDs arranged next to each other in a line, all dot sites in one row of dot sites on the photoreceptor can be selectively exposed simultaneously, and the intensity or duty cycle of each LED can be varied within a line exposure time to expose each pixel site in the row during that line exposure time.

As used herein, an "engine pixel" is the smallest addressable unit on photoreceptor 206 which the exposure subsystem 220 (e.g., the laser or the LED) can expose with a selected exposure different from the exposure of another engine pixel. Engine pixels can overlap (e.g., to increase addressability in the slow-scan direction). Each engine pixel has a corresponding engine pixel location, and the exposure applied to the engine pixel location is described by an engine pixel level.

The exposure subsystem 220 can be a write-white or write-black system. In a write-white or "charged-area-development" system, the exposure dissipates charge on areas of photoreceptor 206 to which toner should not adhere. Toner particles are charged to be attracted to the charge remaining on photoreceptor 206. The exposed areas therefore correspond to white areas of a printed page. In a write-black or "discharged-area development" system, the toner is charged to be attracted to a bias voltage applied to photoreceptor 206 and repelled from the charge on photoreceptor 206. Therefore, toner adheres to areas where the charge on photoreceptor 206 has been dissipated by exposure. The exposed areas therefore correspond to black areas of a printed page.

In the illustrated embodiment, meter 212 is provided to measure the post-exposure surface potential within a patch area of a latent image formed from time to time in a non-image area on photoreceptor 206. Other meters and components can also be included (not shown).

A development station 225 includes toning shell 226, which can be rotating or stationary, for applying toner of a selected color to the latent image on photoreceptor 206 to produce a developed image on photoreceptor 206 corresponding to the color of toner deposited at this printing subsystem 31. Development station 225 is electrically biased by a suitable respective voltage to develop the respective latent image, which voltage can be supplied by a power supply (not shown). Developer is provided to toning shell 226 by a supply system (not shown) such as a supply roller, auger, or belt. Toner is transferred by electrostatic forces from development station 225 to photoreceptor 206. These forces can include Coulombic forces between charged toner particles and the charged electrostatic latent image, and Lorentz forces on the charged toner particles due to the electric field produced by the bias voltages.

In some embodiments, the development station 225 employs a two-component developer that includes toner particles and magnetic carrier particles. The exemplary development station 225 includes a magnetic core 227 to cause the magnetic carrier particles near toning shell 226 to form a "magnetic brush," as known in the electrophotographic art. Magnetic core 227 can be stationary or rotating, and can rotate with a speed and direction the same as or different than the speed and direction of toning shell 226. Magnetic core 227 can be cylindrical or non-cylindrical, and can include a single magnet or a plurality of magnets or magnetic poles disposed around the circumference of magnetic core 227. Alternatively, magnetic core 227 can include an array of solenoids driven to provide a magnetic field of alternating direction. Magnetic core 227 preferably provides a magnetic field of varying magnitude and direction around the outer circumference of toning shell 226. Development station 225 can also employ a mono-component developer comprising toner, either magnetic or non-magnetic, without separate magnetic carrier particles.

Transfer subsystem 50 includes transfer backup member 113, and intermediate transfer member 112 for transferring the respective print image from photoreceptor 206 of imaging member 111 through a first transfer nip 201 to surface 216 of intermediate transfer member 112, and thence to a receiver 42 which receives respective toned print images 38 from each printing subsystem in superposition to form a composite image thereon. The print image 38 is, for example, a separation of one color, such as cyan. Receiver 42 is transported by transport web 81. Transfer to a receiver is effected by an electrical field provided to transfer backup member 113 by power source 240, which is controlled by LCU 99. Receiver 42 can be any object or surface onto which toner can be transferred from imaging member 111 by application of the electric field. In this example, receiver 42 is shown prior to entry into a second transfer nip 202, and receiver 42a is shown subsequent to transfer of the print image 38 onto receiver 42a.

In the illustrated embodiment, the toner image is transferred from the photoreceptor 206 to the intermediate transfer member 112, and from there to the receiver 42. Registration of the separate toner images is achieved by registering the separate toner images on the receiver 42, as is done with the NexPress 2100. In some embodiments, a single transfer member is used to sequentially transfer toner images from each color channel to the receiver 42. In other embodiments, the separate toner images can be transferred in register directly from the photoreceptor 206 in the respective printing subsystem 31, 32, 33, 34, 25 to the receiver 42 without using a transfer member. Either transfer process is suitable when practicing this invention. An alternative method of transferring toner images involves transferring the separate toner images, in register, to a transfer member and then transferring the registered image to a receiver.

LCU 99 sends control signals to the charging subsystem 210, the exposure subsystem 220, and the respective development station 225 of each printing subsystem 31, 32, 33, 34, 35 (FIG. 1), among other components. Each printing subsystem can also have its own respective controller (not shown) coupled to LCU 99.

Various finishing systems can be used to apply features such as protection, glossing, or binding to the printed images. The finishing system scan be implemented as an integral components of the printer 100, or can include one or more separate machines through which the printed images are fed after they are printed.

Figure 3:
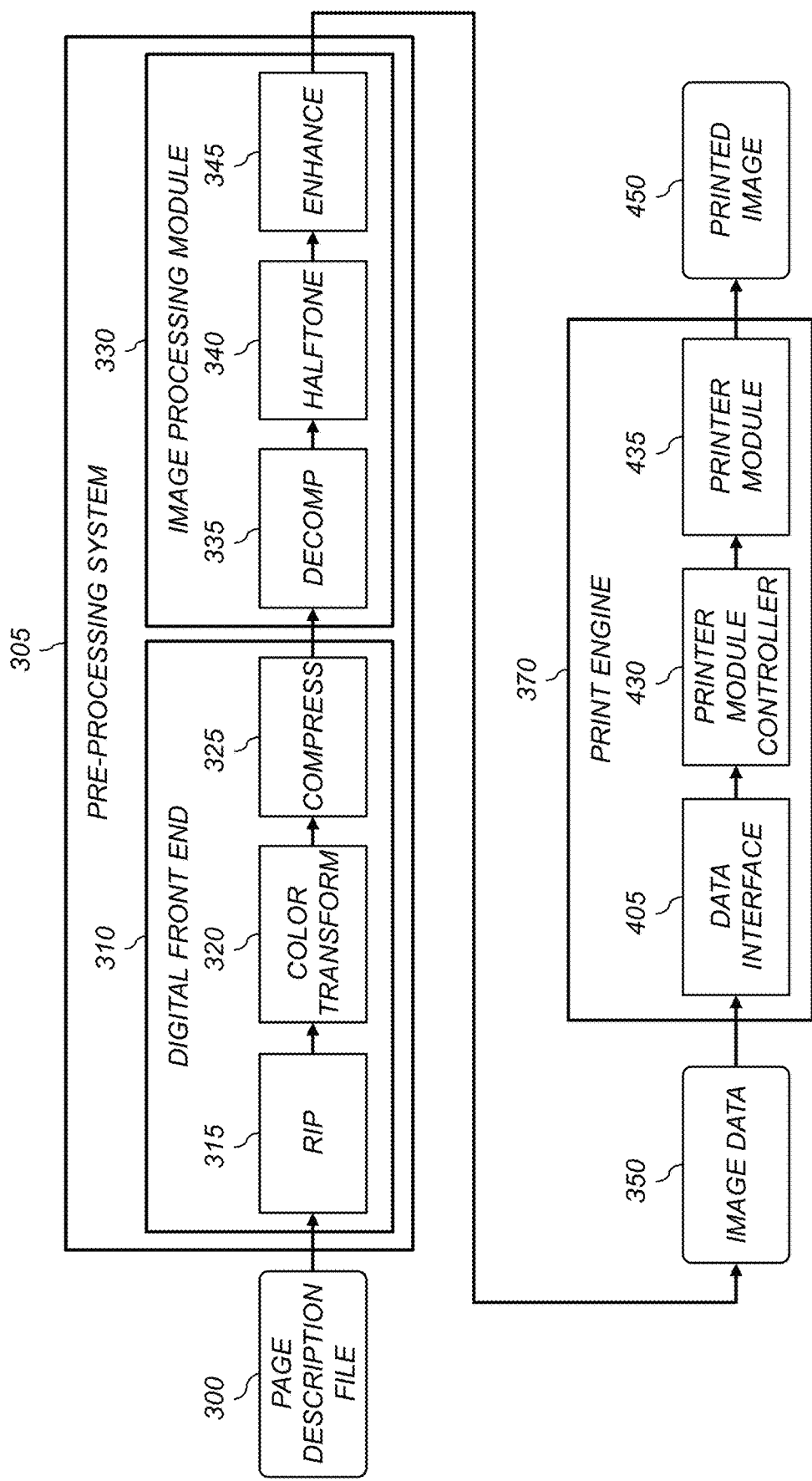
FIG. 3 shows a conventional processing path for producing a printed image using a pre-processing system couple to a print engine.

FIG. 3 shows a conventional processing path that can be used to produce a printed image 450 using a print engine 370. A pre-processing system 305 is used to process a page description file 300 to provide image data 350 that is in a form that is ready to be printed by the print engine 370. In an exemplary configuration, the pre-processing system 305 includes a digital front end (DFE) 310 and an image processing module 330. The pre-processing system 305 can be a part of printer 100 (FIG. 1), or may be a separate system which is remote from the printer 100. The DFE 310 and an image processing module 330 can each include one or more suitably-programmed computer or logic devices adapted to perform operations appropriate to provide the image data 350.

The DFE 310 receives page description files 300 which define the pages that are to be printed. The page description files 300 can be in any appropriate format (e.g., the well-known Postscript command file format or the PDF file format) that specifies the content of a page in terms of text, graphics and image objects. The image objects are typically provided by input devices such as scanners, digital cameras or computer generated graphics systems. The page description file 300 can also specify invisible content such as specifications of texture, gloss or protective coating patterns.

The DFE 310 rasterizes the page description file 300 into image bitmaps for the print engine to print. The DFE 310 can include various processors, such as a raster image processor (RIP) 315, a color transform processor 320 and a compression processor 325. It can also include other processors not shown in FIG. 3, such as an image positioning processor or an image storage processor. In some embodiments, the DFE 310 enables a human operator to set up parameters such as layout, font, color, media type or post-finishing options.

The RIP 315 rasterizes the objects in the page description file 300 into an image bitmap including an array of image pixels at an image resolution that is appropriate for the print engine 370. For text or graphics objects the RIP 315 will create the image bitmap based on the object definitions. For image objects, the RIP 315 will resample the image data to the desired image resolution.

The color transform processor 320 will transform the image data to the color space required by the print engine 370, providing color separations for each of the color channels (e.g., CMYK). For cases where the print engine 370 includes one or more additional colors (e.g., red, blue, green, gray or clear), the color transform processor 320 will also provide color separations for each of the additional color channels. The objects defined in the page description file 300 can be in any appropriate input color space such as sRGB, CIELAB, PCS LAB or CMYK. In some cases, different objects may be defined using different color spaces. The color transform processor 320 applies an appropriate color transform to convert the objects to the device-dependent color space of the print engine 370. Methods for creating such color transforms are well-known in the color management art, and any such method can be used in accordance with the present invention. Typically, the color transforms are defined using color management profiles that include multi-dimensional look-up tables. Input color profiles are used to define a relationship between the input color space and a profile connection space (PCS) defined for a color management system (e.g., the well-known ICC PCS associated with the ICC color management system). Output color profiles define a relationship between the PCS and the device-dependent output color space for the printer 100. The color transform pocessor 320 transforms the image data using the color management profiles. Typically, the output of the color transform pocessor 320 will be a set of color separations including an array of pixels for each of the color channels of the print engine 370 stored in memory buffers.

The processing applied in digital front end 310 can also include other operations not shown in FIG. 3. For example, in some configurations, the DFE 310 can apply the halo correction process described in commonly-assigned U.S. Pat. No. 9,147,232 (Kuo) entitled "Reducing halo artifacts in electrophotographic printing systems," which is incorporated herein by reference.

The image data provided by the digital front end 310 is sent to the image processing module 330 for further processing. In order to reduce the time needed to transmit the image data, a compressor pocessor 325 is typically used to compress the image data using an appropriate compression algorithm. In some cases, different compression algorithms can be applied to different portions of the image data. For example, a lossy compression algorithm (e.g., the well-known JPEG algorithm) can be applied to portions of the image data including image objects, and a lossless compression algorithm can be applied to portions of the image data including binary text and graphics objects. The compressed image values are then transmitted over a data link to the image processing module 330, where they are decompressed using a decompression pocessor 335 which applies corresponding decompression algorithms to the compressed image data.

A halftone pocessor 340 is used to apply a halftoning process to the image data. The halftone pocessor 340 can apply any appropriate halftoning process known in the art. Within the context of the present disclosure, halftoning processes are applied to a continuous-tone image to provide an image having a halftone dot structure appropriate for printing using the printer module 435. The output of the halftoning can be a binary image or a multi-level image. In an exemplary configuration, the halftone pocessor 340 applies the halftoning process described in commonly assigned U.S. Pat. No. 7,830,569 (Tai et al.), entitled "Multilevel halftone screen and sets thereof," which is incorporated herein by reference. For this halftoning process, a three-dimensional halftone screen is provided that includes a plurality of planes, each corresponding to one or more intensity levels of the input image data. Each plane defines a pattern of output exposure intensity values corresponding to the desired halftone pattern. The halftoned pixel values are multi-level values at the bit depth appropriate for the print engine 370.

The image enhancement pocessor 345 can apply a variety of image processing operations. For example, an image enhancement pocessor 345 can be used to apply various image enhancement operations. In some configurations, the image enhancement pocessor 345 can apply an algorithm that modifies the halftone process in edge regions of the image (see U.S. Pat. No. 7,079,281, entitled "Edge enhancement processor and method with adjustable threshold setting" and U.S. Pat. No. 7,079,287 entitled "Edge enhancement of gray level images" (both to Ng et al.), and both of which are incorporated herein by reference).

The pre-processing system 305 provides the image data 350 to the print engine 370, where it is printed to provide the printed image 450. The pre-processing system 305 can also provide various signals to the print engine 370 to control the timing at which the image data 350 is printed by the print engine 370. For example, the pre-processing system 305 can signal the print engine 370 to start printing when a sufficient number of lines of image data 350 have been processed and buffered to ensure that the pre-processing system 305 will be capable of keeping up with the rate at which the print engine 370 can print the image data 350.

A data interface 405 in the print engine 370 receives the data from the pre-processing system 305. The data interface 405 can use any type of communication protocol known in the art, such as standard Ethernet network connections. A printer module controller 430 controls the printer module 435 in accordance with the received image data 350. In an exemplary configuration, the printer module 435 can be the printer 100 of FIG. 1, which includes a plurality of individual electrophotographic printing subsystems 31, 32, 33, 34, 35 for each of the color channels. For example, the printer module controller 430 can provide appropriate control signals to activate light sources in the exposure subsystem 220 (FIG. 2) to expose the photoreceptor 206 with an exposure pattern. In some configurations, the printer module controller 430 can apply various image enhancement operations to the image data. For example, an algorithm can be applied to compensate for various sources of non-uniformity in the printer 100 (e.g., streaks formed in the charging subsystem 210, the exposure subsystem 220, the development station 225 or the fuser module 60. One such compensation algorithm is described in commonly-assigned U.S. Pat. No. 8,824,907 (Kuo et al.), entitled "Electrophotographic printing with column-dependent tonescale adjustment," which is incorporated herein by reference.

In the configuration of FIG. 3, the pre-processing system 305 is tightly coupled to the print engine 370 in that it must supply image data 350 in a state which is matched to the printer resolution and the halftoning state required for the printer module 435. As a result, when new versions of the print engine 370 having different printer resolutions or halftone state requirements are developed, it has been necessary to also provide an updated version of the pre-processing system 305 that provides image data 350 in an appropriate state. This has the disadvantage that customers are required to upgrade both the pre-processing system 305 and the print engine 370 at the same time, both of which can have significant costs. The present invention addresses this problem by providing an improved print engine design which is compatible with a variety of different pre-processing systems.

Figure 4:
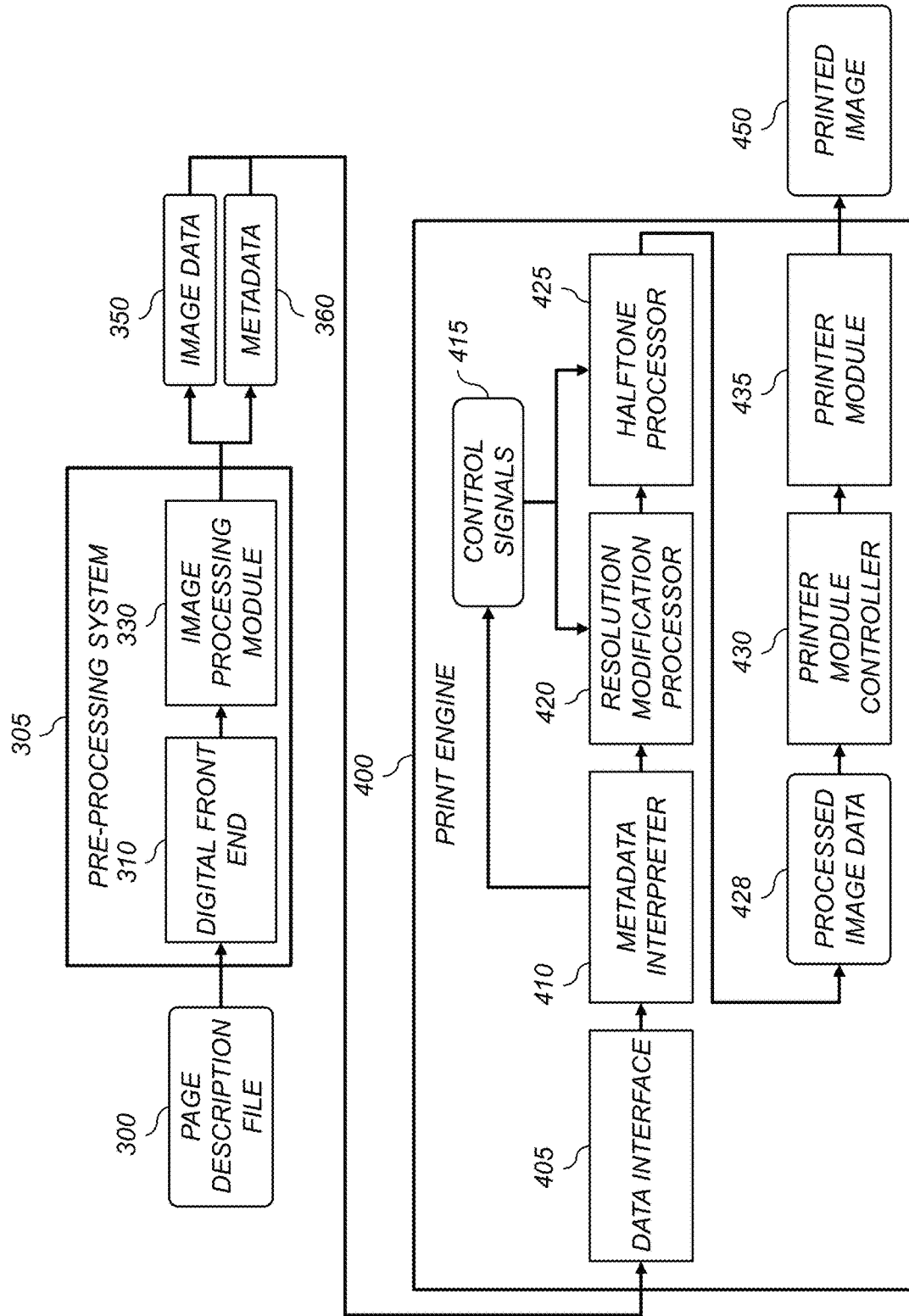
FIG. 4 shows a processing path including a print engine that is adapted to produce printed images from image data supplied by a variety of different pre-processing systems.

FIG. 4 shows an improved print engine 400 as described in commonly-assigned U.S. Pat. No. 10,062,017 to C. H. Kuo et al., entitled "Print engine with adaptive processing," which is incorporated herein by reference. The improved print engine 400 is adapted to produce printed images 450 from image data 350 provided by a plurality of different pre-processing systems 305 that are configured to supply image data 350 having different image resolutions and halftoning states. In an exemplary configuration, the pre-processing systems 305 are similar to that discussed with respect to FIG. 3, and includes a digital front end 310 and an image processing module 330. Details of the processing provided by the digital front end 310 and an image processing module 330 are not included in FIG. 4 for clarity, but will be analogous to the processing operations that were discussed with respect to FIG. 3. In this case, in addition to supplying image data 350, the pre-processing system 305 also supplies appropriate metadata 360 that provides an indication of the state of the image data 350. In particular, the metadata 360 provides an indication of the image resolution and the halftoning state of the image data 350.

In an exemplary configuration, the metadata 360 includes an image resolution parameter that provides an indication of an image resolution of the image data 350 provided by the pre-processing system 305 and a halftone state parameter that provides an indication of a halftoning state of the image data provided by the pre-processing system 305.

The image resolution parameter (R) can take any appropriate form that conveys information about the image resolution of the image data 350. In some embodiments, the image resolution parameter can be an integer specifying the spatial resolution in appropriate units such as dots/inch (dpi) (e.g., R=600 for 600 dpi and R=1200 for 1200 dpi). In other embodiments, the image resolution parameter can be an index to an enumerated list of allowable spatial resolutions (e.g., R=0 for 600 dpi and R=1 for 1200 dpi).

The halftone state parameter (H) can also take any appropriate form. In some embodiments, the halftone state parameter can be a Boolean variable indicating whether or not a halftoning process was applied in the pre-processing system 305 such that the image data 350 is in a halftoned state (e.g., H=FALSE indicates that a halftoning process was not applied so that the image data 350 is in a continuous tone state, and H=TRUE indicates that a halftoning process was applied sot that the image data 350 is in a halftoned state.) In other embodiments, when the pre-processing system 305 applied a halftoning process, the halftone state parameter can also convey additional information about the type of halftoning process that was applied. For example, the halftone state parameter can be an integer variable, where H=0 indicates that no halftoning process was applied, and other integer values represent an index to an enumerated list of available halftoning states (e.g., different screen frequency/ angle/dot shape combinations).

The metadata 360 can also specify other relevant pieces of information. For example, for the case where the image data 350 is in a continuous tone state such that a halftone pocessor 425 in the print engine 400 will be required to apply a halftoning operation, the metadata 360 can also include one or more halftoning parameters that are used by the halftone pocessor 425 to control the halftoning operation. In some embodiments, the halftoning parameters can include a screen angle parameter, a screen frequency parameter, or a screen type parameter. In other embodiments, the halftoning parameters can include a halftone configuration index that is used to select one of a predefined set of halftone algorithm configurations.

The print engine 400 receives the image data 350 and the metadata 360 using an appropriate data interface 405 (e.g., an Ethernet interface). The print engine includes a metadata interpreter 410 that analyzes the metadata 360 to provide appropriate control signals 415 that are used to control a resolution modification pocessor 420 and a halftone pocessor 425, which are used to process the image data 350 to provide processed image data 428, which is in an appropriate state to be printed by the printer module 435. Printer module controller 430 then controls the printer module 435 to print the processed image data 428 to produce the printed image 450 in an analogous manner to that which was discussed relative to FIG. 3.

Figure 5:
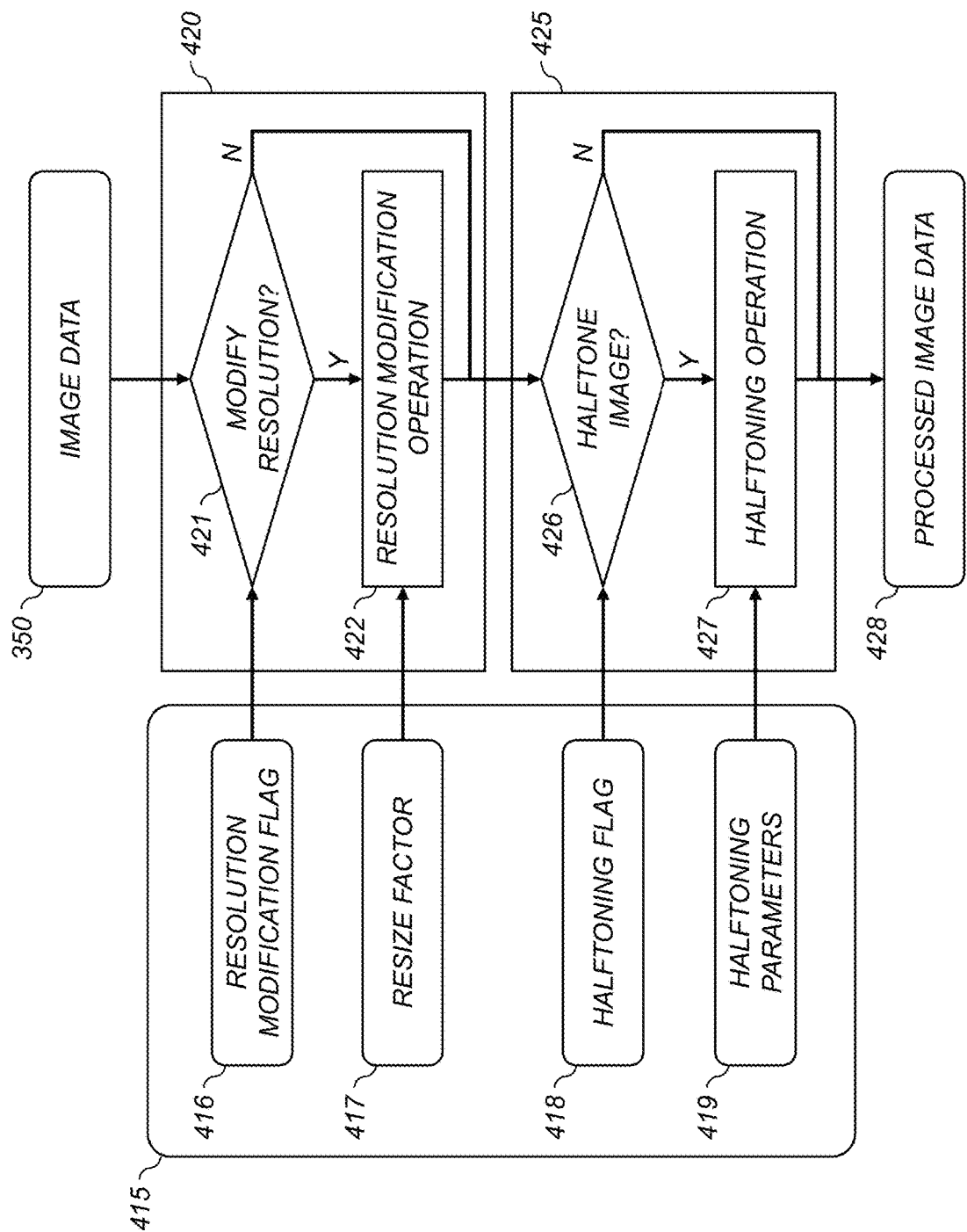
FIG. 5 shows additional details for the resolution modification processor and the halftone processor of FIG. 4.

FIG. 5 shows additional details of the resolution modification pocessor 420 and the halftone pocessor 425 of FIG. 4 according to an exemplary configuration. In this example, the control signals 415 provided by the metadata interpreter 410 (FIG. 4) in response to analyzing the metadata 360 (FIG. 4) include a resolution modification flag 416, a resize factor 417, a halftoning flag 418 and halftoning parameters 419.

The resolution modification flag 416 provides an indication of whether a resolution modification must be performed. In an exemplary configuration the resolution modification flag 416 is a Boolean variable that would be set to FALSE if no resolution modification is required (i.e., if the image resolution of the image data 350 matches the printer resolution of the printer module 435), and would be set to TRUE of a resolution modification is required.

The halftoning flag 418 provides an indication of whether a halftoning operation is required. In an exemplary configuration the halftone flag 418 is a Boolean variable that would be set to FALSE if no halftoning operation is required (i.e., if the image data 350 is in a halftoning state that is appropriate for the printer module 435), and would be set to TRUE if a halftoning operation must be applied to the image data 350 before it is ready to be printed.

The resolution modification pocessor 420 applies modify resolution test 421 to determine whether a resolution modification should be performed responsive to the resolution modification flag 416. If a resolution modification is required, a resolution modification operation 422 is performed. In some configurations, the metadata interpreter 410 (FIG. 4) provides a resize factor 417 that specifies the amount of resizing that must be provided to adjust the resolution of the image data 350 to the resolution required by the printer module 435 (FIG. 4). In some configurations, the resize factor 417 is a variable specifying the ratio between the printer resolution and the image resolution. For example, if the image data 350 is at 600 dpi and the printer module 435 prints at 1200 dpi, the resize factor 417 would specify that a 2× resolution modification is required. In various configurations the resize factor 417 could be greater than 1.0 if the printer module 435 has a higher resolution than the image data 350, or it could be less than 1.0 if the printer module 435 has a lower resolution than the image data 350.

In an exemplary configuration, if the image resolution of the image data 350 supplied by the pre-processing system 305 is an integer fraction of the printer resolution of the printer module 435 so that the resize factor 417 is a positive integer, the resolution modification operation 422 performs the resolution modification by performing a pixel replication process. For example, each 600 dpi image pixel in the image data 350 would be replaced with a 2×2 array of 1200 dpi image pixels, each having the same pixel value. In other configurations, an appropriate interpolation process can be used by the resolution modification operation 422 (e.g., nearest neighbor interpolation, bi-linear interpolation or bi-cubic interpolation). The use of an interpolation algorithm is particularly useful of the resize factor is not an integer.

For cases where the resize factor is less than 1.0, the resolution modification operation 422 can perform appropriate averaging operations to avoid aliasing artifacts. For example, if the resize factor 417 is 0.5, then 2×2 blocks of image pixels in the image data 350 can be averaged together to provide the new resolution. In other configurations, the resolution modification operation 422 can apply a low-pass filter operation followed by a resampling operation.

The halftone pocessor 425 applies halftone image test 426 to determine whether a halftoning operation should be performed responsive to the halftoning flag 418. If a halftoning operation is required (e.g., if the image data 350 is in a continuous-tone state), a halftoning operation 427 is performed. In some configurations, the metadata interpreter 410 (FIG. 4) provides one or more halftoning parameters 419 that are used to control the halftoning operation. As discussed earlier, the halftoning parameters 419 can include a screen angle parameter, a screen frequency parameter, or a screen type parameter. In other embodiments, the halftoning parameters 419 can include a halftone configuration index that is used to select one of a predefined set of halftone algorithm configurations.

The halftoning operation applied by the halftone pocessor 425 can use any appropriate halftoning algorithm known in the art. In some embodiments, any of the halftoning algorithms described in commonly-assigned U.S. Pat. No. 7,218,420 (Tai et al.), entitled "Gray level halftone processing," commonly-assigned U.S. Pat. No. 7,626,730 (Tai et al.), entitled "Method of making a multilevel halftone screen," and commonly-assigned U.S. Pat. No. 7,830,569 (Tai et al.), entitled, "Multilevel halftone screen and sets thereof," each of which are incorporated herein by reference, can be used. Such halftoning algorithms typically involve defining look-up tables defining the halftone dot shape as a function of position for a tile of pixels. Different look-up tables can be specified to produce different halftone dot patterns. For example, different look-up tables can be specified for different screen angles, screen frequencies and dot shapes. In this case, the halftoning parameters 419 can include a halftone configuration index that selects which look-up table should be used to halftone the image data 350. In a preferred configuration, the halftone pocessor 425 uses a computational halftone process to compute halftoned pixel values using a defined set of calculations. An exemplary computational halftone process that can be used in accordance with the present invention is described in the aforementioned U.S. Pat. No. 10,062,017.

Consider the case where the printer module 435 prints halftoned image data at 1200 dpi, but where different pre-processing systems 305 and configurations can be used to supply image data 350 at either 600 dpi or 1200 dpi, and in either a halftoned state or a continuous tone state. In this case, there will be four different combinations of the image resolution parameters and the halftone state parameters that the print engine must deal with.

1. The image resolution parameter indicates that image data 350 is 600 dpi, and the halftone state parameter indicates that the image data 350 is in a halftoned state. In this case, the print engine 400 would print the image data 350 in a mode that emulates a 600 dpi printer. The resolution modification processor 420 would be used to modify the image resolution to provide the 1200 dpi data required by the printer module 435. In an exemplary embodiment, each 600 dpi image pixel is replicated to provide a 2×2 array of 1200 dpi image pixels. Since the image data is already in a halftoned state, the halftone operation 427 would be bypassed.

2. The image resolution parameter indicates that the image data 350 is 600 dpi, and the halftone state parameter indicates that the image data 350 is in a continuous-tone state. In this case, the resolution modification pocessor 420 would be used to modify the image resolution to provide the 1200 dpi data appropriate for the printer module 435, and the halftone pocessor 425 would apply a halftoning operation 427 to the 1200 dpi image data in accordance with the halftoning parameters 419.

3. The image resolution parameter indicates that the image data 350 is 1200 dpi, and the halftone state parameter indicates that the image data 350 is in a halftoned state. In this case, the image data 350 is already in a state that is ready for printing by the printer module 435, therefore the resolution modification operation 422 and the halftoning operation 427 would both be bypassed.

4. The image resolution parameter indicates that image data 350 is 1200 dpi, and the halftone state parameter indicates that the image data 350 is in a continuous-tone state. In this case, since the image data is already at 1200 dpi so that the resolution modification operation 422 would be bypassed, and the halftone pocessor 425 would apply a halftoning operation 427 to the 1200 dpi image data in accordance with the halftoning parameters 419.

Figure 6A:
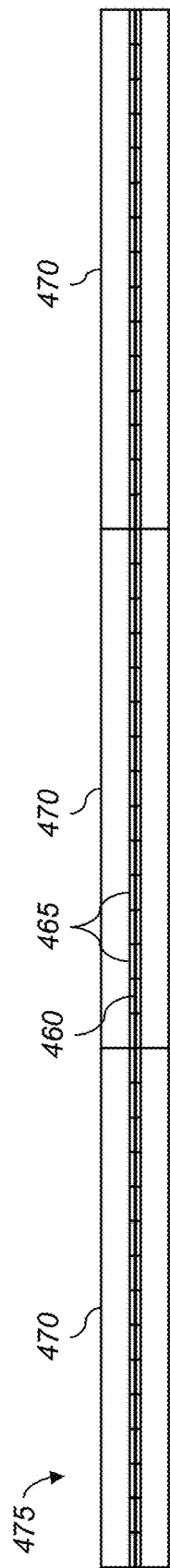
FIG. 6A shows an exemplary printhead including three light source tiles, each including 15 light source chips.
Figure 6B:
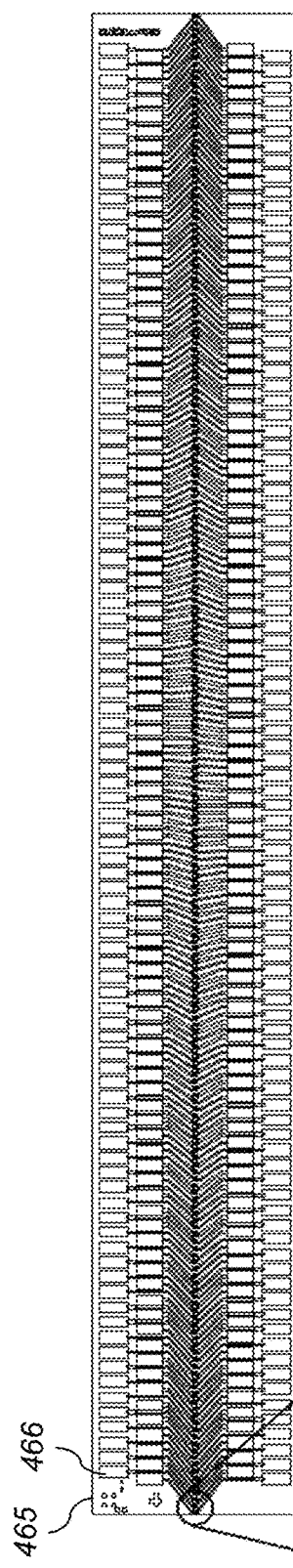
FIG. 6B shows an exemplary light source chip including a linear array of 384 LEDs.

The exposure subsystem 220 (FIG. 2) in each printing subsystem 31, 32, 33, 34, 35 (FIG. 1) typically includes a printhead 475 having a linear array of light sources 460 as illustrated in FIG. 6A. In an exemplary embodiment, the light sources 460 are LED light sources, although other types of light sources such as laser diodes can also be used. In the illustrated configuration, the printhead 475 is fabricated using three light source tiles 470, each of which includes fifteen light source chips 465. The light source chips 465 include a linear array of 384 individual light sources 460 as illustrated in FIG. 6B. Each of the light sources 460 is connected to a corresponding connection pad 466 through which an electrical signal is provided to selectively activate the light source 460 in accordance with image data. The light sources 460 have a width $W_S$, a height $H_S$ and a light source pitch (i.e., a light source-to-light source spacing) $P_S$. In an exemplary configuration, $W_S$=12 µm, $H_S$=15 µm and $P_S$=21.15 µm (corresponding to 1200 dots/inch).

The light source chips 465 are positioned end-to-end in the printhead 475 to form a single array of 384×15×3=17,280 light sources 460. Ideally, each of the light sources 460 are spaced with an identical spacing $P_S$, such that they expose the photoreceptor 206 in a predictable location. However, in practice there will be a number of sources of variability that can introduce cross-track position errors in the exposed pixels relative to their expected positions. Sources of cross-track position errors can include variations in the light source pitch $P_S$ within a light source chip 465, variation in the length of the light source chips 465, placement errors in the position of the light source chips 465 within a light source tile 470, variation in the length of the light source tiles 470, placement errors in the position of the light source tiles 470 within the printhead 475, and placement errors in the position of the printhead 475. Additionally, the light sources 460 in the printhead 475 are typically imaged onto the photoreceptor 206 with an array of micro-lenses. The micro-lenses are typically gradient index "SELFOC" lens rods. Variations in the position and orientation of the micro-lenses can also introduce variability in the position of the image of the light sources 460 on the photoreceptor 206, which will combine with the other sources of variation.

Cross-track position errors for the light sources 460 in the printhead 475 can be particularly problematic when they differ from one printing subsystem 31, 32, 33, 34, 35 to another, resulting in color-to-color alignment errors which can be visible and objectionable in many instances. To provide acceptable alignment, the color-to-color alignment errors should typically be less than 40 µm, and more preferably should be less than 20 µm. However, with typical manufacturing tolerances, alignment errors as large as 200 µm have been observed. Therefore, there is a need for a method to characterize and correct for the cross-track position errors that can be implemented without the need for complex and costly fixtures.

Figure 7:
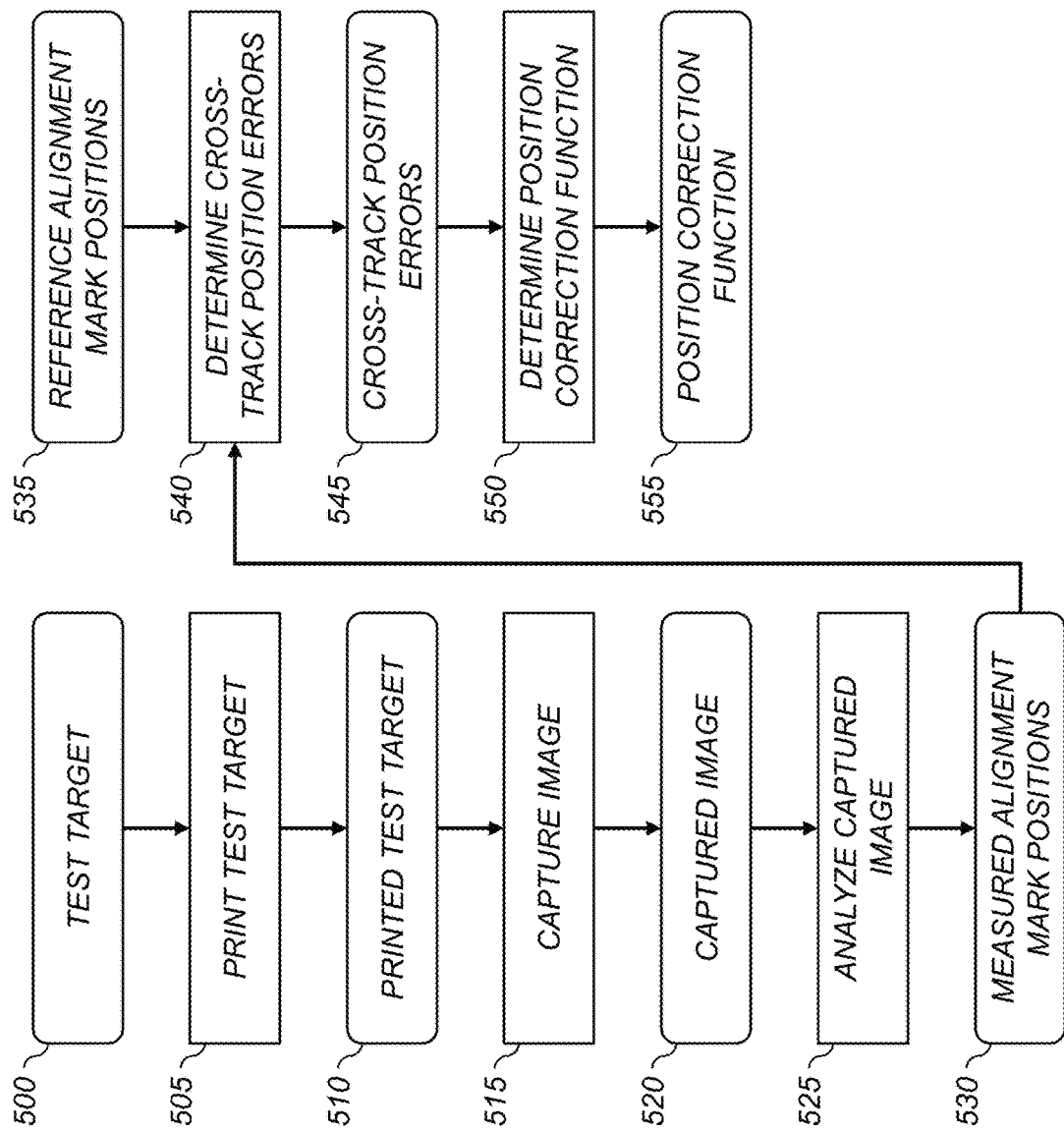
FIG. 7 shows a flowchart of a process for determining a position correction function in accordance with an exemplary embodiment.

As described in commonly-assigned, co-pending U.S. patent application Ser. No. 16/417,731, entitled: "Correcting cross-track errors in a linear printhead", by Kuo et al., which is incorporated herein by reference, FIG. 7 shows a flowchart of a method for determining a position correction function 555 that characterizes the cross-track position errors associated with a printhead 475 (FIG. 6A) in accordance with an exemplary embodiment. The method includes providing digital image data for a test target 500. The test target 500 preferably includes a plurality of alignment marks 570 positioned at predefined cross-track positions as illustrated in the exemplary arrangement shown in FIG. 8. The alignment marks 570 are preferably distributed along the length of the printhead 475 which spans the test target 500 in a cross-track direction 590. The test target 500 may optionally include other content such as solid patches 575 that can be used for other calibration or characterization purposes. In an exemplary arrangement, the test target 500 includes alignment marks 570 for a plurality of different color channels. In the illustrated example, the test target includes first color channel image content 580 for a first color channel printed by a first printing subsystem 31 (FIG. 1), second color channel image content 581 for a second color channel printed by a second printing subsystem 32 (FIG. 1), third color channel image content 582 for a third color channel printed by a third printing subsystem 32 (FIG. 1), and fourth color channel image content 583 for a fourth color channel printed by a fourth printing subsystem 34 (FIG. 1). The image content for each color channel is provided in different image regions distributed in the in-track direction 595. The different color channels can be, for example, black, cyan, magenta and yellow. However, one skilled in the art will recognize that the color channels can use other colorants as well. Each of different image regions includes a corresponding set of alignment marks 570. In other embodiments, rather than using a single test target 500 including alignment marks 570 for all of the color channels, they can be included in a plurality of test targets 500 (e.g., one for each color channel).

Figure 8:
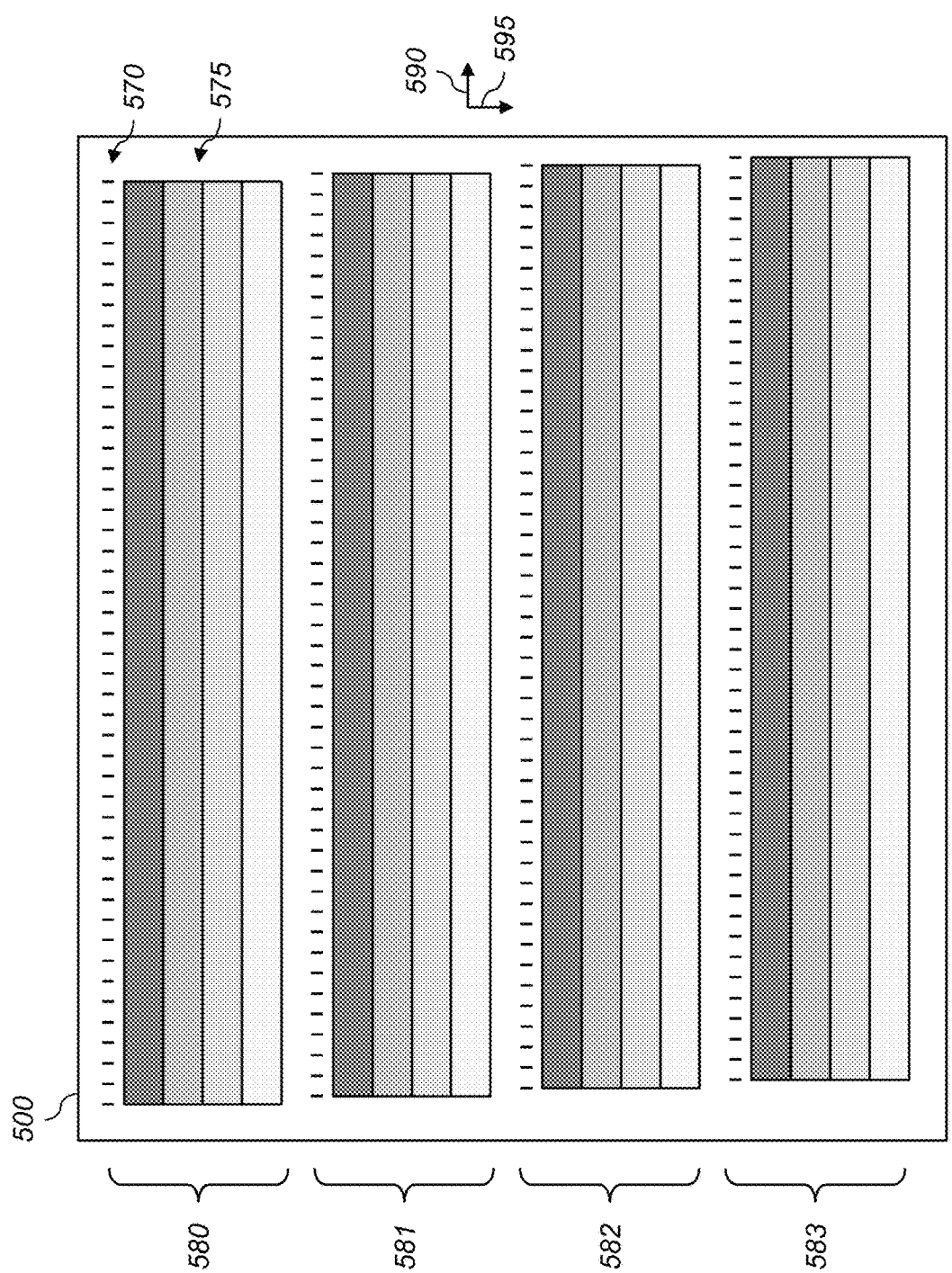
FIG. 8 illustrates an exemplary test target that includes alignment marks useful for determining a position correction function.

In the illustrated example of FIG. 8, the alignment marks 570 are pictured as an array of equally spaced vertical lines. However, one skilled in the art will recognize that there are a wide variety of different alignment mark spacings and geometries that could be used in accordance with the present invention. In some configurations, the width or the cross-track position of the vertical lines can be varied along the length of the line in order to enable the centroid of the printed line to be more accurately measured. In other cases, the alignment marks could include crossed lines, circles, diamonds, squares or any other geometric shape that can be analyzed to determine a cross-track position of the alignment marks.

In an exemplary arrangement, an alignment marks 570 are provided in proximity to the boundaries between adjacent light source chips 465 in the printhead 475 (FIG. 6A). This reflects the fact that the most common sources of position errors relate to length variability and positioning errors for the light source chips 465 and light source tiles 470. Therefore, forty-four alignment marks 570 would be used for a printhead 475 that includes three light source tiles, each including fifteen light source chips 465. Preferably, at least ten alignment marks 570 are provided across the length of the printhead 475 to enable the characterization and correction of localized, non-linear cross-track alignment errors.

Returning to a discussion of FIG. 7, a print test target step 505 is used to print the test target 500 to produce a printed test target 510. In a preferred embodiment, the printed test target 510 is formed on a piece of receiver 42 (FIG. 2) such as a sheet of paper. In other cases, the printed test target 510 can be an image transferred directly onto the transport web 81 rather than onto a sheet of receiver 42. In other embodiments, the printed test target 510 can correspond to an intermediate image formed on the surface of the imaging member 111 (i.e., the photoreceptor 206) or the surface 216 of an intermediate transfer member 112 (see FIG. 2).

A capture image step 515 is next used to capture a digital image of the printed test target 510 using a digital image capture system to provide a captured image 520. In an exemplary embodiment, the digital image capture system is a flatbed scanner external to the printer 100 which is used to scan the printed test target 510 formed on a receiver 42 after it has been completely printed and fused. In other embodiments, a digital image capture system (e.g., a digital scanner system or a digital camera system) which is integrated into the printer 100 can be used to capture an image of the printed test target 510 on the receiver 42 while the receiver 42 is traveling through the printer 100 (e.g., while it is being carried on the transport web 81), or before it has been transferred to the receiver 42 (e.g., on surface of the imaging member 111 or the intermediate transfer member 112). Next, an analyze captured image step 525 is used to automatically analyze the captured image 520 to determine measured alignment mark positions 530. The measured alignment mark positions 530 include at least the cross-track positions of the alignment marks 570 in the test target 500. In some embodiments the measured alignment mark positions 530 can also include the in-track positions of the alignment marks 570. (The in-track positions of the alignment marks 570 can be utilized to correct for artifacts such as substrate skew.) In an exemplary embodiment, a plurality of image lines in the captured image 520 are identified which intersect the alignment marks 570. The image lines are averaged to determine a combined image trace which includes traces through the individual alignment marks 570. Equivalently, a low-pass filter can be applied to the image data to average the pixel values in a range of in-track positions, and the combined image trace can be determined by taking a single trace through the filtered image. Preferably, any skew in the captured image 520 can be characterized (e.g., by detecting the boundaries of the solid patches 575) and accounted for in the image analysis process. For example, the captured image 520 can be rotated to remove the skew. Alternatively, the image traces can be taken along lines parallel to the skew angle, or the image can be filtered using a low-pass filter which is rotated by the skew angle.

The combined image trace can then be analyzed to determine the measured alignment mark positions 530. FIG. 9A shows an example of a combined image trace 526, which includes alignment mark profiles 527 for each of the alignment marks 570. The "scanner code values" on the y-axis have been inverted such that "0" is white and "255" is black. The measured alignment mark positions 530 for each of the alignment marks can then be determined by computing a quantity corresponding to a measure of the central tendency for each of the alignment mark profiles 527. For example, the measure of the central tendency can be the centroid (i.e., the mean), the median or the mode of the alignment mark profile 527.

In an exemplary embodiment, an idealized profile function 528 is fit to the alignment mark profile 527 as illustrated in FIG. 9B. The alignment mark profile 527 in this figure corresponds to the circled alignment mark profile 527 in FIG. 9A, and has been shifted to remove the density of the paper. A Gaussian function was then fit to the alignment mark profile 527 to determine the idealized profile function 528. The measured alignment mark position 530 is then determined by computing the measure of central tendency (i.e., the centroid) of the idealized profile function 528. This approach has the advantage that it is less susceptible to noise in the image data.

Next, a determine cross-track position errors step 540 is used to determine cross-track position errors 545 by comparing the measured alignment mark positions 530 with corresponding reference alignment mark positions 535. In some embodiments, the reference alignment mark positions 535 can correspond to ideal positions of the alignment marks 570 determined from their positions in the original test target 500. In a preferred embodiment, one of the color channels is designated to be a reference color channel, and the other color channels are designated to be non-reference color channels. In this case, the measured alignment mark positions 530 for the reference color channel are used as the reference alignment mark positions 535 for the non-reference color channels. In this way, the cross-track position errors 545 for the non-reference color channels correspond to cross-track differences between the image content printed in the non-reference color channel and the reference color channel. In some configurations, a predefined color channel (e.g., the black color channel) is designated to be the reference color channel. In other cases, it can be advantageous to designate the color channel that has the largest cross-track line length (e.g., the color channel having the largest cross-track distance between the first and last alignment marks) to be the reference color channel. In this case, the position corrections that are applied to the non-reference color channels will stretch out the image data (e.g., by repeating certain image pixels) rather than shortening the image data (e.g., by deleting certain image pixels). This eliminates the possibility that a portion of a single-pixel wide line might be erased by deleting the corresponding image pixels.

Figure 10A:
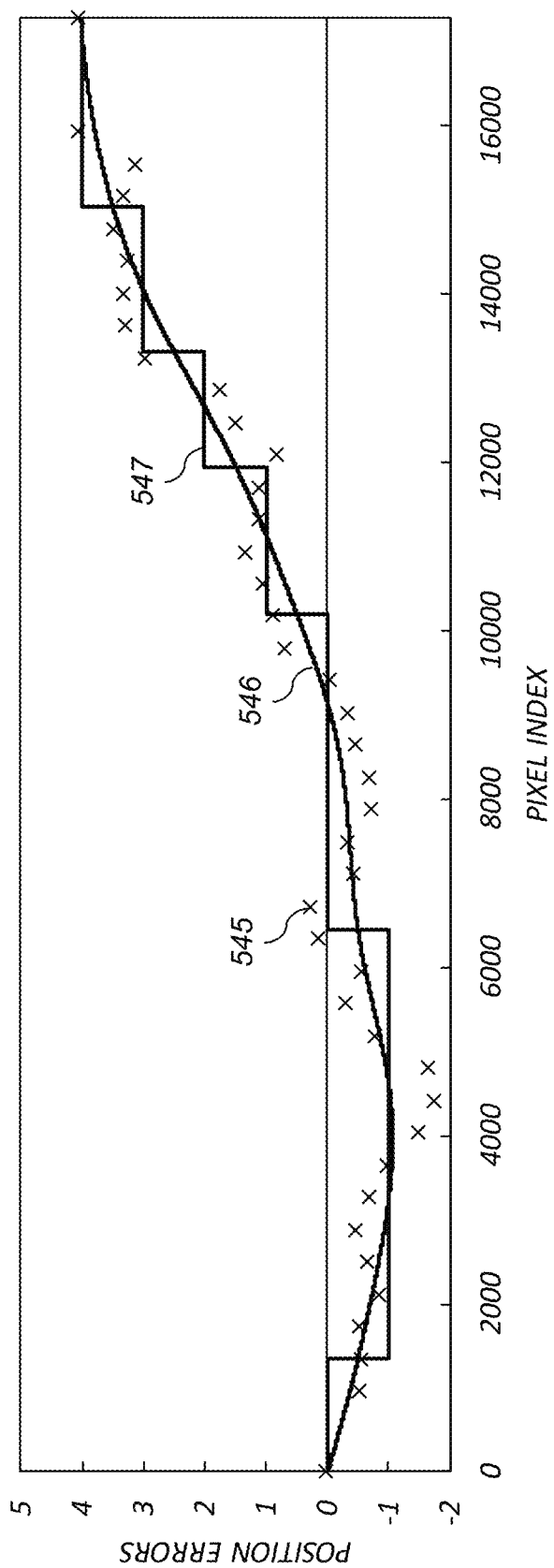
FIG. 10A illustrates an exemplary cross-track position error function determined using the method of FIG. 6.

FIG. 10A illustrates the cross-track position errors 545 determined for a printed test target 510 produced using an exemplary printhead 475. The cross-track position errors 545 were determined by computing the difference between the measured alignment mark positions 530 and the corresponding reference alignment mark positions 535. A positive cross-track position error 545 corresponds to the case where the position of the alignment mark in the printed image is longer than the reference position (i.e., to the right), and a negative cross-track position error 545 corresponds to the case where the printed image is shorter than the reference position (i.e., to the left). It can be seen in this example, that a portion of the printhead has negative cross-track position errors, while another portion of the printhead has positive cross-track position errors, indicating that the spacing between the light sources varies across the width of the printhead.

A determine position correction function step 550 is then used to determine a position correction function 555 based on the measured cross-track position errors 545. The position errors in this example are scaled by the output pixel spacing so that they represented in terms of the number of output pixels (e.g., the number of 1200 dpi pixels). In an exemplary embodiment, a smooth function is fit to the measured cross-track position errors 545 to determine a cross-track position error function 546. For example, the cross-track position error function 546 can be determined by fitting a smoothing spline or a polynomial function to the measured cross-track position errors 545. Such smoothing operations are well-known to those skilled in the art.

In an exemplary embodiment, corrections are applied by resampling the image data. In this case, the resampling operation effectively shifts the image data as a function of pixel position by an integer number of output pixels. The required shift can be determined by quantizing the cross-track position error function 546 to determine a quantized cross-track position error function 547. The quantized cross-track position error function 547 gives an indication of how many pixels to the right or left the output pixel position has been shifted. For example, the quantized position error for pixel indices in the range of 1357-6441 are one pixel to the left of their expected positions.

Figure 10B:
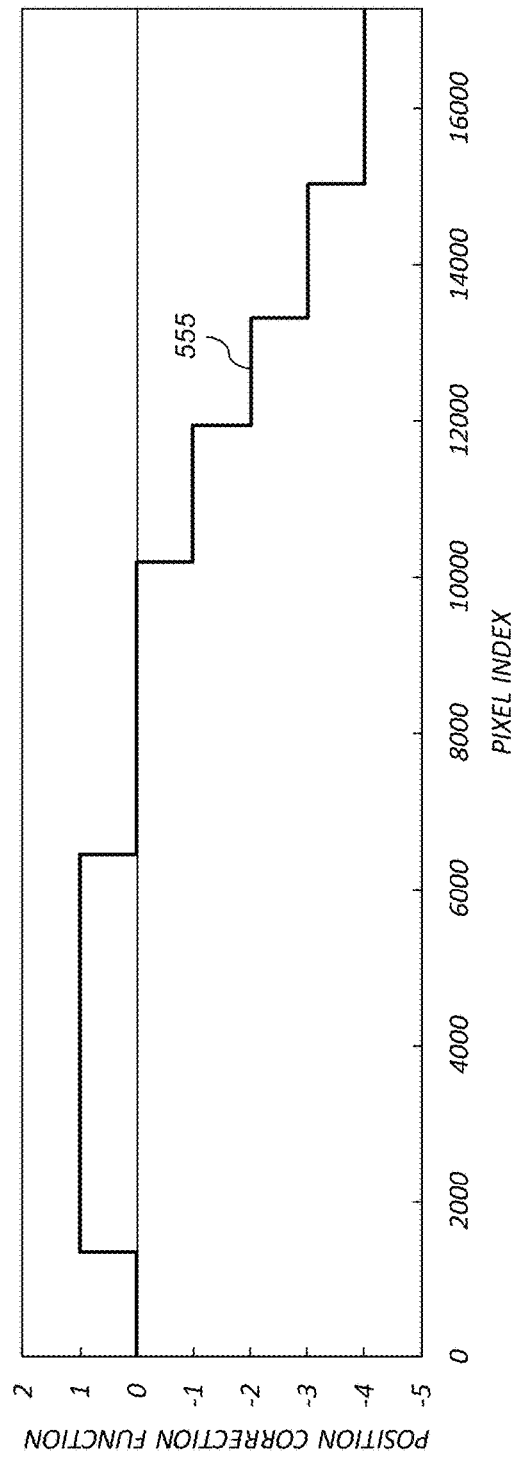
FIG. 10B illustrates an exemplary position correction function corresponding to the cross-track position error function of FIG. 10A.

In order to correct for the cross-track position errors, a position correction function 555 can be determined by inverting the quantized cross-track position error function 547 as shown in FIG. 10B. In an exemplary embodiment, the correction is applied by resampling the image data at shifted pixel positions. The position correction function 555 gives an indication of how many output pixels the image data should be shifted as a function of cross-track pixel position.

Figure 10C:
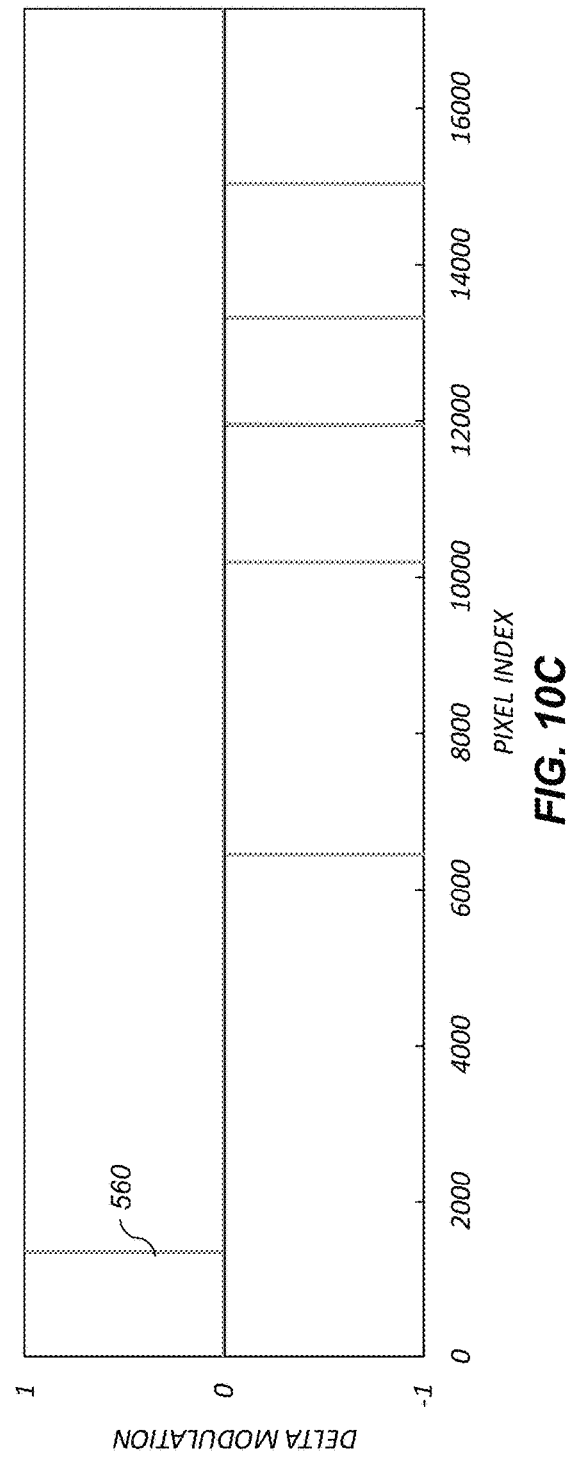
FIG. 10C illustrates a position correction function representation corresponding to the position correction function of FIG. 10B.

A representation of the position correction function 555 can be stored in a digital memory in any appropriate format to be used in the correction of digital image data. For example, the full position correction function 555 can be stored in the digital memory, either in a quantized form such as that illustrated in FIG. 10B, or in an unquantized form. Alternatively, the position correction function 555 can be represented in other formats. For example, the quantized position correction function 555 of FIG. 10B can be fully represented by storing the differences between the quantized position correction values at sequential pixel positions. An example of such a position correction function representation 560 is illustrated in FIG. 10C. The position correction function representation 560 can be stored in digital memory in a variety of encoding formats. For example, the differences (i.e., which can also referred to as the "transition direction" or the "delta modulation values") can be stored as a function of pixel index. Alternatively, the cross-track positions and transition directions (i.e., the delta modulation values) of the transitions where the quantized position correction values change (i.e., the pixel indices having non-zero delta modulation values) can be stored in a table such as that shown in Table 1.

TABLE 1

Cross-track position correction function representation

| Pixel Index | Delta Modulation Value |
|---|---|
| 1357 | +1 |
| 6442 | −1 |
| 10204 | −1 |
| 11957 | −1 |
| 13318 | −1 |
| 15042 | −1 |

Once the position correction function 555 has been determined, the image lines of a digital image can be modified to determine corrected image lines responsive to the stored position correction function. In a preferred embodiment, the image lines are resampled at positions corresponding to the pixel shifts specified in a position correction function 555 such as that shown in FIG. 10C.

Figure 11:
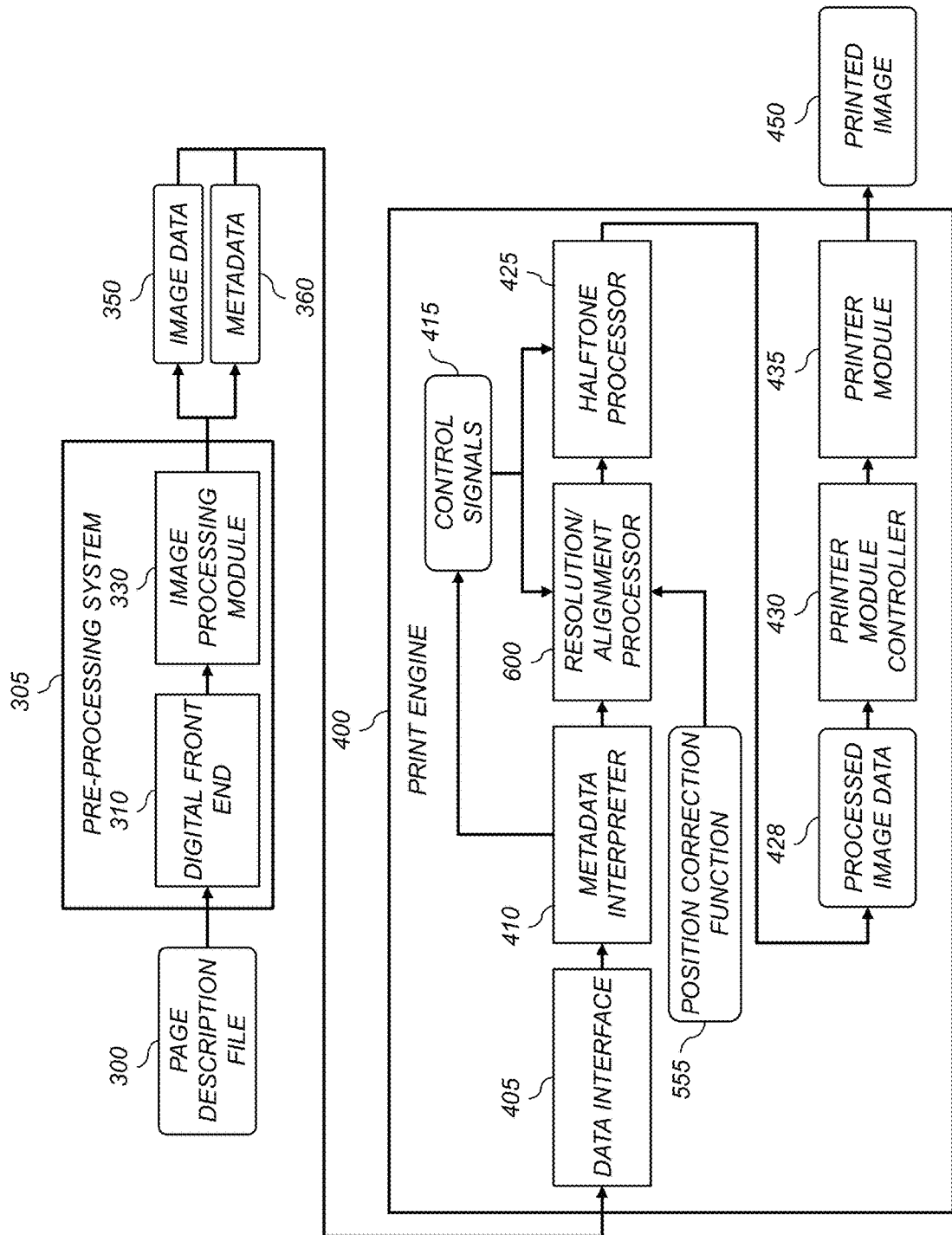
FIG. 11 shows an improved processing path including a print engine that is adapted to produce printed images incorporating cross-track position corrections in accordance with an exemplary embodiment.

FIG. 11 shows an improved processing path including a print engine that is adapted to produce printed images incorporating cross-track position corrections in accordance with an exemplary embodiment. The improved processing path is analogous to the processing path of FIG. 4 except that the resolution modification pocessor 420 has been replaced by a resolution/alignment pocessor 600, which corrects the alignment responsive to the position correction function 555 in addition to performing any resolution modifications specified by the control signals 415.

Figure 12:
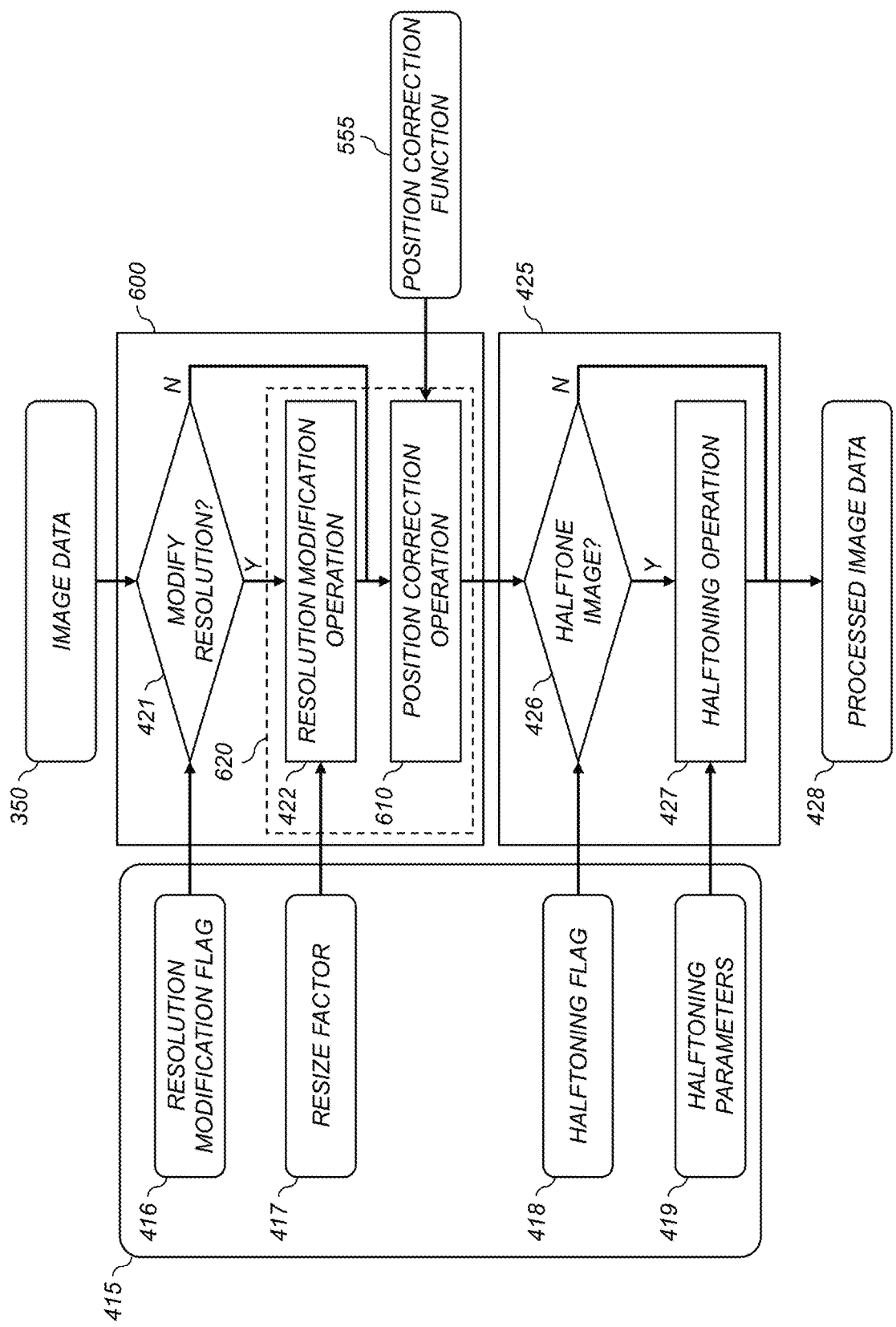
FIG. 12 shows additional details for the resolution/alignment processor and the halftone processor of FIG. 11.

FIG. 12 shows additional details for the resolution/alignment pocessor 600 and the halftone pocessor 425 of FIG. 11. This process is similar to that of FIG. 5 except for the addition of a position correction operation 610. As discussed earlier, the resolution modification operation 422 involves resampling the image data 350 in accordance with a resize factor. The position correction operation 610 also involves a resampling of the image data. In an exemplary embodiment, the resolution modification operation 422 and the position correction operation 610 can be combined into a single unified resampling operation 620 rather than two sequential resampling operations.

In an exemplary embodiment, the unified resampling operation 620 uses a "nearest neighbor" resampling process where each output pixel is set to the value of the input pixel nearest to the corresponding sampling position. This ensures that the density of thin lines and text is maintained. In other embodiments, an interpolation process can be used to interpolate between the input pixel values to determine the output pixel values at the determined sampling positions.

Figure 13:
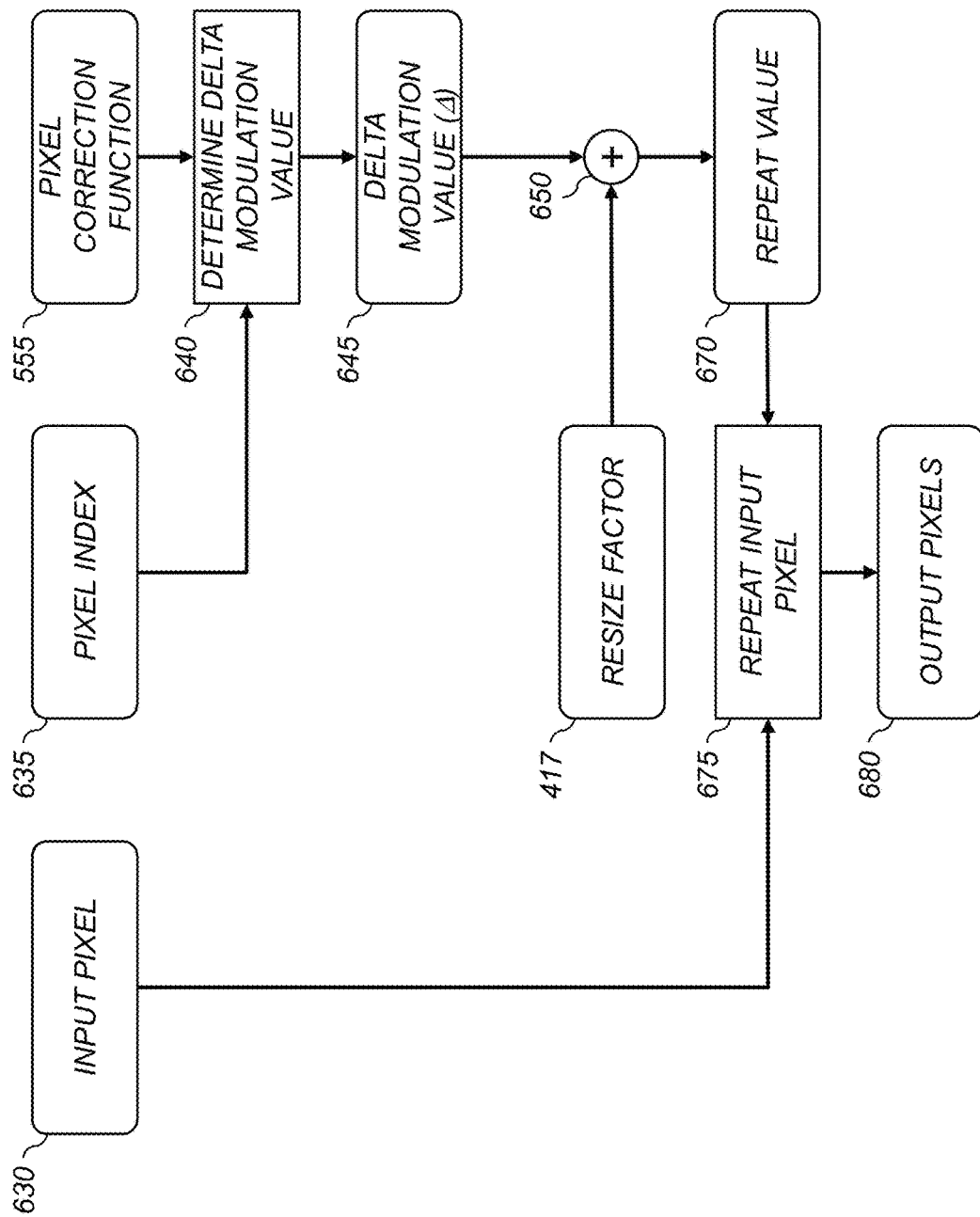
FIG. 13 illustrates a flow chart for a resampling operation that combines the resolution modification operation and the position correction operation of FIG. 12 in accordance with an exemplary embodiment.

FIG. 13 shows an exemplary method for processing an input pixel 630 of the image data 350 (FIG. 12) having an associated cross-track pixel index 635 using the unified resampling operation 620 of FIG. 12. This exemplary method corresponds to the special case where the resize factor 417 is 2× (e.g., when the image data 350 (FIG. 12) has a resolution of 600 dpi and the processed image data 428 (FIG. 12) has a resolution of 1200 dpi). A determine delta modulation value step 640 is used to determine a delta modulation value (Δ) 645 corresponding to the pixel index 635 responsive to the pixel correction function 555. For example, the pixel index 635 can be used to look-up the delta modulation value 645 in a position correction function 555 such as that shown in FIG. 10B. Alternatively, the pixel index 635 can be compared to the pixel indices in a table such as that shown in Table 1 to determine whether the delta modulation value 645 is non-zero, and if so what its value should be.

An adder 650 is then used to combine the resize factor 417 and the delta modulation value 645 to determine a repeat value 670. The repeat value 670 indicates how many times the input pixel 630 should be repeated in the line of output pixels 680. For example, If the resize factor 417 is 2× and the delta modulation value 645 is Δ=0, the repeat value 670 will have a nominal value of "2" so that the input pixel 630 will be repeated twice in accordance with the resize factor 417. If the delta modulation value 645 is Δ=−1 or Δ=+1, the repeat value 670 will be adjusted to be "1" or "3," respectively, to correct for the cross-track position errors.

A repeat input pixel step 675 is then used to determine output pixels 680 corresponding to the input pixel 630 by repeating the input pixel 630 a number of times (e.g., 1, 2 or 3 times) according to the repeat value 670. The process of FIG. 13 is repeated for every input pixel 630 in each image line of the image data 350 (FIG. 12). Note that each determined line of output pixels 680 will be repeated twice in output image data given the resize factor 417 of 2×.

For the case where the resize factor 417 is 1×, a delta modulation value 645 of Δ=−1 would give a repeat value 670 of "0." A consequence of this would be that if the input pixel 630 corresponds to a single pixel wide line, then it would be erased from the output image. To avoid such artifacts, if the resize factor is 1× it is generally desirable to avoid negative delta modulation values 645. This can be generally be accomplished by designating the color channel that is determined to have a longest cross-track line length to be the reference color channel. In this way, the length of the other color channels will be stretched rather than compressed.

Even if the resize factor 417 is 2× or larger, non-zero delta modulation values 645 can cause the line widths of thin lines (e.g., single pixel wide lines) to be modified to a degree that a user may detect the difference. For example, a line which would normally be two output pixels wide after applying the 2× resize factor 417 could be one or three output pixels wide. To avoid such artifacts, it is generally desirable to avoid aligning the non-zero delta modulation values 645 with thin features in the input image. In one embodiment, a plurality of different position correction functions 555 can be provided where the cross-track positions of the transitions are shifted to the left or right. If the user observes objectionable changes in the feature widths, then the user can select one of the alternate position correction functions 555. In other embodiments, the input image can be analyzed to identify the position of thin image features, and the positions of the transitions can be shifted such that they are moved away from the thin image features (e.g., into a white background region).

In some embodiments, the printer 100 (FIG. 1) includes an image capture system which can be used to capture images of the printed test target 510 on an appropriate imaging surface as discussed earlier. In such cases, the calibration method of FIG. 7 can be performed automatically without the need for a user to manually handle the printed test target 510. The calibration method can be performed at predefined intervals, or can be initiated by a user when it is observed that the printer is producing printed images having objectionable cross-track position errors.

Figure 14:
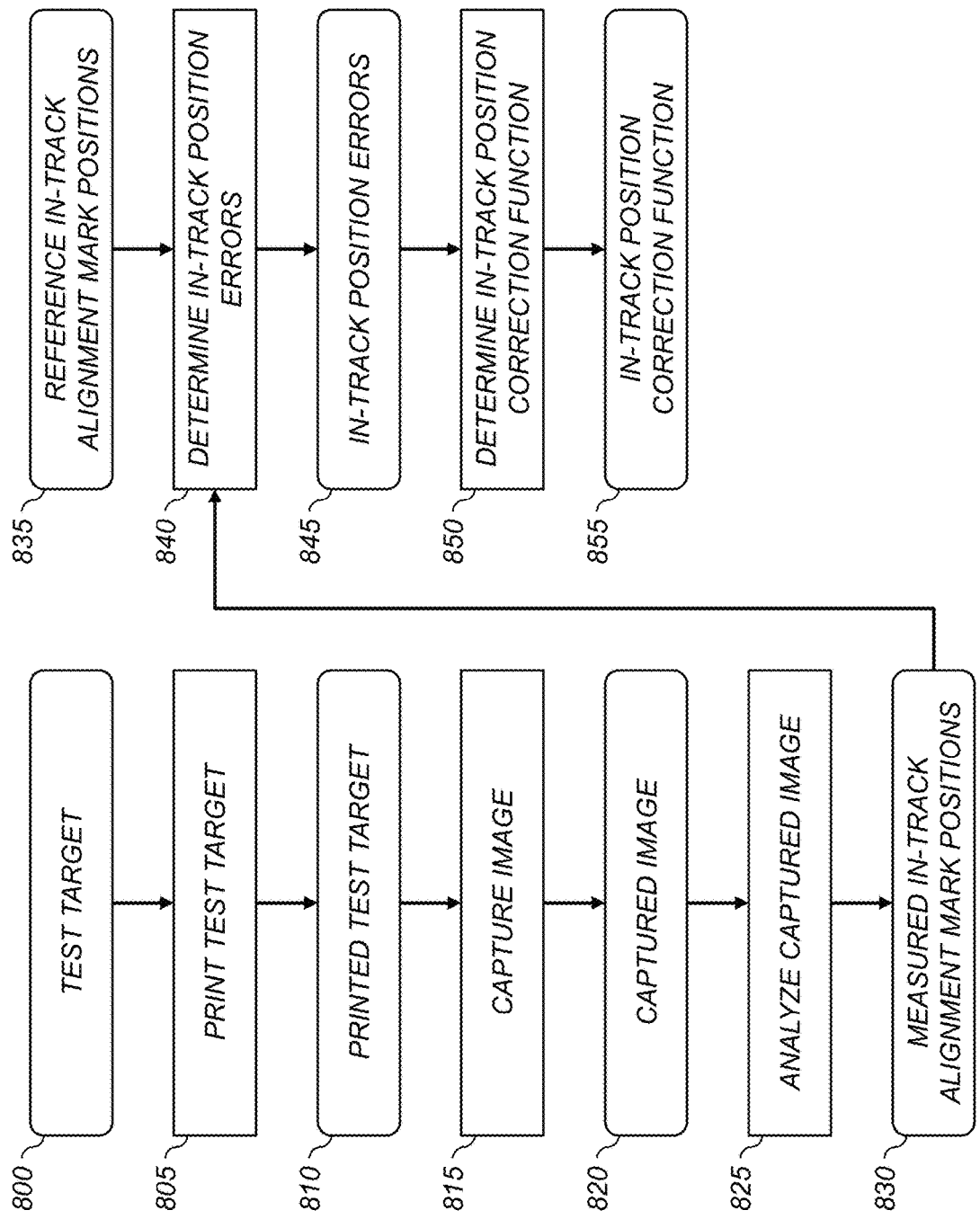
FIG. 14 shows a flowchart of a process for determining an in-track position correction function in accordance with an exemplary embodiment.

The method for correction cross-track alignment errors that was described relative to FIGS. 7-13 can be adapted to also be used to correct for in-track alignment errors. FIG. 14 shows a flowchart of a method for determining an in-track position correction function 855 that characterizes and corrects the in-track position errors associated with a printhead 475 (FIG. 6A) in accordance with an exemplary embodiment. The in-track position errors may result from a variety of sources including skew of the printhead 475 relative to the imaging member 111 (FIG. 2), misalignment of the individual light source chips 465 or light source tiles 470 within the printhead 475, misalignment of the imaging optics (e.g., the SELFOC lens), or deformation of the imaging member 111. The method includes providing digital image data for a test target 800. The test target 800 preferably includes a plurality of in-track alignment marks 870 positioned at predefined cross-track positions as illustrated in the exemplary arrangement shown in FIG. 15. The in-track alignment marks 870 are preferably distributed along the length of the printhead 475 which spans the test target 800 in a cross-track direction 590. The test target 800 may optionally include other content such as cross-track alignment marks 570 that can be used to correct for cross-track alignment errors as has been previously described, and solid patches 575 that can be used for other calibration or characterization purposes. In an exemplary arrangement, the test target 800 includes in-track alignment marks 870 for a plurality of different color channels. In the illustrated example, the test target includes first color channel image content 580 for a first color channel printed by a first printing subsystem 31 (FIG. 1), second color channel image content 581 for a second color channel printed by a second printing subsystem 32 (FIG. 1), third color channel image content 582 for a third color channel printed by a third printing subsystem 32 (FIG. 1), and fourth color channel image content 583 for a fourth color channel printed by a fourth printing subsystem 34 (FIG. 1). Each of different color channels includes a corresponding set of in-track alignment marks 870. The different color channels can be, for example, black, cyan, magenta and yellow. However, one skilled in the art will recognize that the color channels can use other colorants as well. In other embodiments, rather than using a single test target 800 including in-track alignment marks 870 for all of the color channels, they can be included in a plurality of test targets 800 (e.g., one for each color channel).

Figure 15:
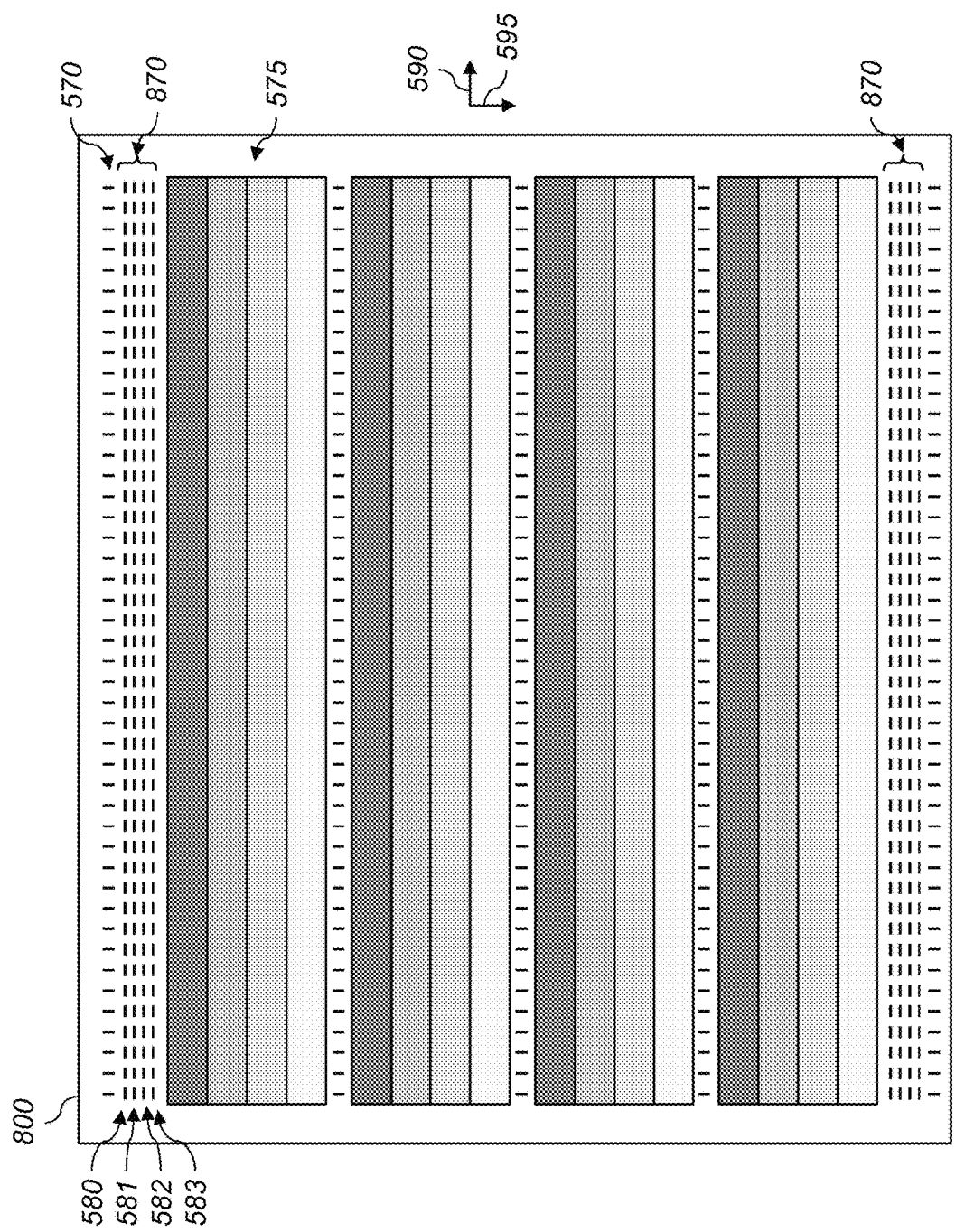
FIG. 15 illustrates an exemplary test target that includes in-track alignment marks useful for determining an in-track position correction function.

In the illustrated example of FIG. 15, the in-track alignment marks 870 are pictured as an array of equally spaced horizontal lines all positioned at the same nominal position in the in-track direction 595. However, one skilled in the art will recognize that there are a wide variety of different alignment mark spacings and geometries that could be used in accordance with the present invention. In some configurations, the width or the in-track position of the horizontal lines can be varied along the length of the line in order to enable the centroid of the printed line to be more accurately measured. In other cases, the in-track alignment marks 870 could include crossed lines, circles, diamonds, squares or any other geometric shape that can be analyzed to determine the in-track position of the alignment marks. In some cases, the cross-track alignment marks 570 and the in-track alignment marks 870 can be combined into a single set of alignment marks that are adapted to enable the determination of both in-track and cross-track positions of the alignment marks.

In an exemplary arrangement, in-track alignment marks 870 are provided in proximity to the boundaries between adjacent light source chips 465 in the printhead 475 (FIG. 6A). This reflects the fact that some of the most common sources of in-track position errors relate to positioning errors for the light source chips 465 and light source tiles 470. Therefore, forty-four in-track alignment marks 870 can be used for a printhead 475 that includes three light source tiles, each including fifteen light source chips 465. In other arrangements, multiple sets of in-track alignment marks 870 can be provided for each light source chip 465. For example, two sets of in-track alignment marks 870 could be provided for each light source chip 465, one closer to the left edge and one closer to the right edge. Preferably, at least ten in-track alignment marks 870 are provided across the length of the printhead 475 to enable the characterization and correction of localized, non-linear cross-track alignment errors.

Returning to a discussion of FIG. 14, a print test target step 805 is used to print the test target 800 to produce a printed test target 810. In a preferred embodiment, the printed test target 810 is formed on a piece of receiver 42 (FIG. 2) such as a sheet of paper. In other cases, the printed test target 810 can be an image transferred directly onto the transport web 81 rather than onto a sheet of receiver 42. In other embodiments, the printed test target 810 can correspond to an intermediate image formed on the surface of the imaging member 111 (i.e., the photoreceptor 206) or the surface 216 of an intermediate transfer member 112 (see FIG. 2).

A capture image step 815 is next used to capture a digital image of the printed test target 810 using a digital image capture system to provide a captured image 820. In an exemplary embodiment, the digital image capture system is a flatbed scanner external to the printer 100 which is used to scan the printed test target 810 formed on a receiver 42 after it has been completely printed and fused. In other embodiments, a digital image capture system (e.g., a digital scanner system or a digital camera system) which is integrated into the printer 100 can be used to capture an image of the printed test target 810 on the receiver 42 while the receiver 42 is traveling through the printer 100 (e.g., while it is being carried on the transport web 81), or before it has been transferred to the receiver 42 (e.g., on surface of the imaging member 111 or the intermediate transfer member 112).

Next, an analyze captured image step 825 is used to automatically analyze the captured image 820 to determine measured in-track alignment mark positions 830. The measured in-track alignment mark positions 830 include at least the in-track positions of the in-track alignment marks 870 (FIG. 15) in the test target 800. In an exemplary embodiment, a plurality of image columns in the captured image 820 are identified which intersect the in-track alignment marks 870. The image columns are averaged to determine a combined image trace (which can also be referred to as an in-track alignment mark profile) for each of the individual in-track alignment marks 870. Equivalently, a low-pass filter can be applied to the image data to average the pixel values in a range of cross-track positions, and the combined image trace can be determined by taking a single trace through the filtered image. Preferably, any skew in the captured image 820 can be characterized (e.g., by detecting the boundaries of the solid patches 575) and accounted for in the image analysis process. For example, the captured image 820 can be rotated to remove the skew. Alternatively, the image traces can be taken along lines parallel to the skew angle, or the image can be filtered using a low-pass filter which is rotated by the skew angle. The in-track alignment mark profile then be analyzed to determine the measured alignment mark positions 830. In an exemplary embodiment, an idealized profile function 528 is fit to the in-track alignment mark profile in a manner analogous to the method that was described earlier relative to the cross-track alignment mark profile 527 in the discussion of FIG. 9B. The measured in-track alignment mark position 830 is then determined by computing the measure of central tendency (i.e., the centroid) of the idealized profile function 528. This approach has the advantage that it is less susceptible to noise in the image data.

Next, a determine in-track position errors step 840 is used to determine in-track position errors 845 by comparing the measured in-track alignment mark positions 830 with corresponding reference in-track alignment mark positions 835. In some embodiments, the reference in-track alignment mark positions 835 can correspond to ideal positions of the alignment marks 870 corresponding to their positions in the original test target 800. In some embodiments, the reference in-track alignment mark positions 835 can correspond to the measured in-track alignment mark position 830 for one of the alignment marks (e.g., the leftmost alignment mark or the center alignment mark). In some embodiments, one of the color channels is designated to be a reference color channel, and the other color channels are designated to be non-reference color channels. In this case, the reference in-track alignment mark positions 835 for the non-reference color channels can be specified given the known relative positions of the alignment mark positions in the original test target 800. In this way, the in-track position errors 845 for the non-reference color channels will reflect any channel-to-channel registration errors in addition to any within-channel skew.

Figure 16A:
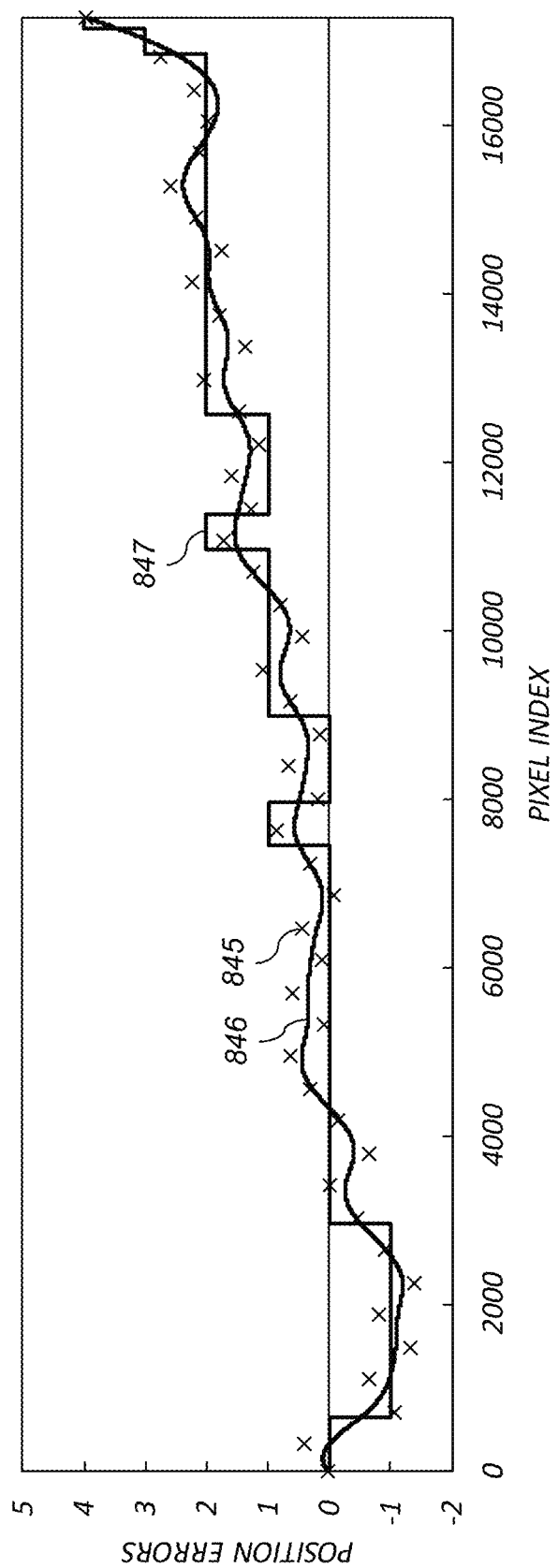
FIG. 16A illustrates an exemplary in-track position error function determined using the method of FIG. 14.

FIG. 16A illustrates the in-track position errors 845 determined for a printed test target 810 produced using an exemplary printhead 475. The in-track position errors 845 were determined by computing the difference between the measured in-track alignment mark positions 830 and the corresponding reference in-track alignment mark positions 835. A positive cross-track position error 845 corresponds to the case where the position of the in-track alignment mark in the printed image is above than the reference position on the printed test target 810 (i.e., downstream relative to the printing direction assuming that the top of the image is printed first), and a negative in-track position error 845 corresponds to the case where the printed image is below the reference position (i.e., upstream relative to the printing direction assuming that the top of the image is printed first). In this example, the printhead 475 is skewed so that the right edge of the printed image is printed higher on the page than the left edge. Additionally, there are some local deviations in the in-track position.

A determine in-track position correction function step 850 is then used to determine an in-track position correction function 855 based on the measured in-track position errors 845. The in-track position errors in this example are scaled by the output pixel spacing so that they represented in terms of the number of output pixels (e.g., the number of 1200 dpi pixels). In an exemplary embodiment, a smooth function is fit to the measured in-track position errors 845 to determine an in-track position error function 846. For example, the in-track position error function 846 can be determined by fitting a smoothing spline or a polynomial function to the measured in-track position errors 845. Such smoothing operations are well-known to those skilled in the art.

In an exemplary embodiment, in-track alignment corrections are applied by resampling the image data. In this case, the resampling operation effectively shifts the image data in the in-track direction as a function of cross-track pixel position by an integer number of output pixels. The required shift can be determined by quantizing the in-track position error function 846 to determine a quantized in-track position error function 847. The quantized in-track position error function 847 gives an indication of how many pixels up or down the output pixel position has been shifted. For example, the quantized in-track position error for cross-track pixel indices in the range of 645-2965 indicate that the pixels are approximately one pixel below their expected positions.

Figure 16B:
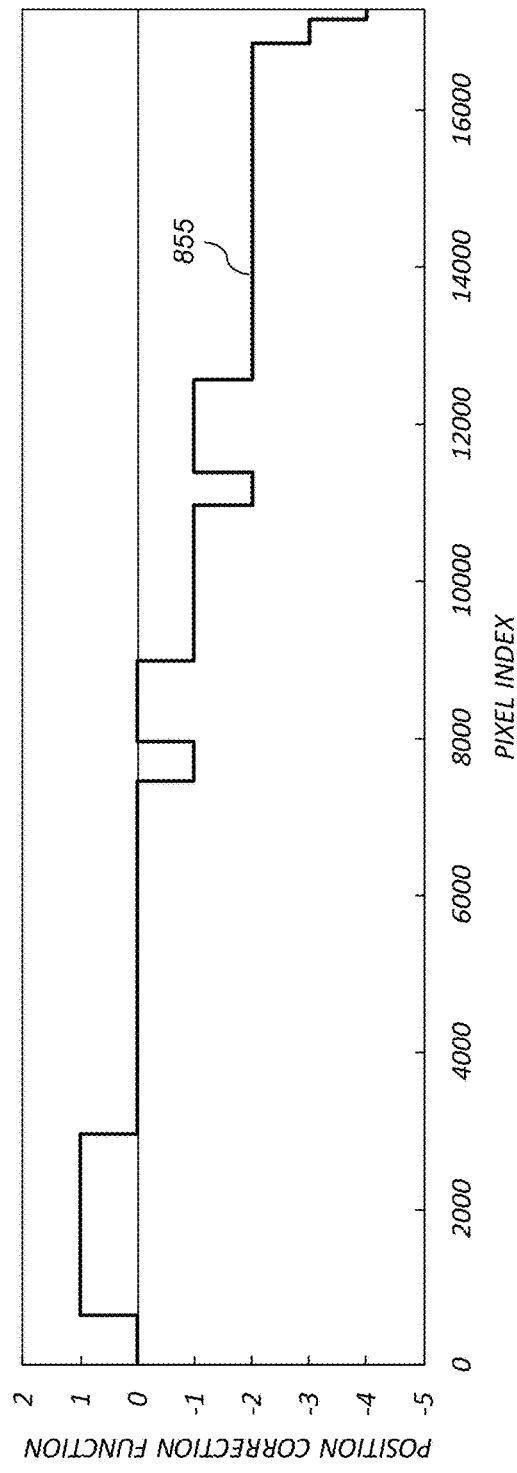
FIG. 16B illustrates an exemplary in-track position correction function corresponding to the in-track position error function of FIG. 16A.

In order to correct for the in-track position errors, an in-track position correction function 855 can be determined by inverting the quantized in-track position error function 847 as shown in FIG. 16B. In an exemplary embodiment, the correction is applied by resampling the image data at shifted pixel positions. The in-track position correction function 855 gives an indication of how many output pixels the image data should be shifted in the in-track direction as a function of cross-track pixel position.

Figure 16C:
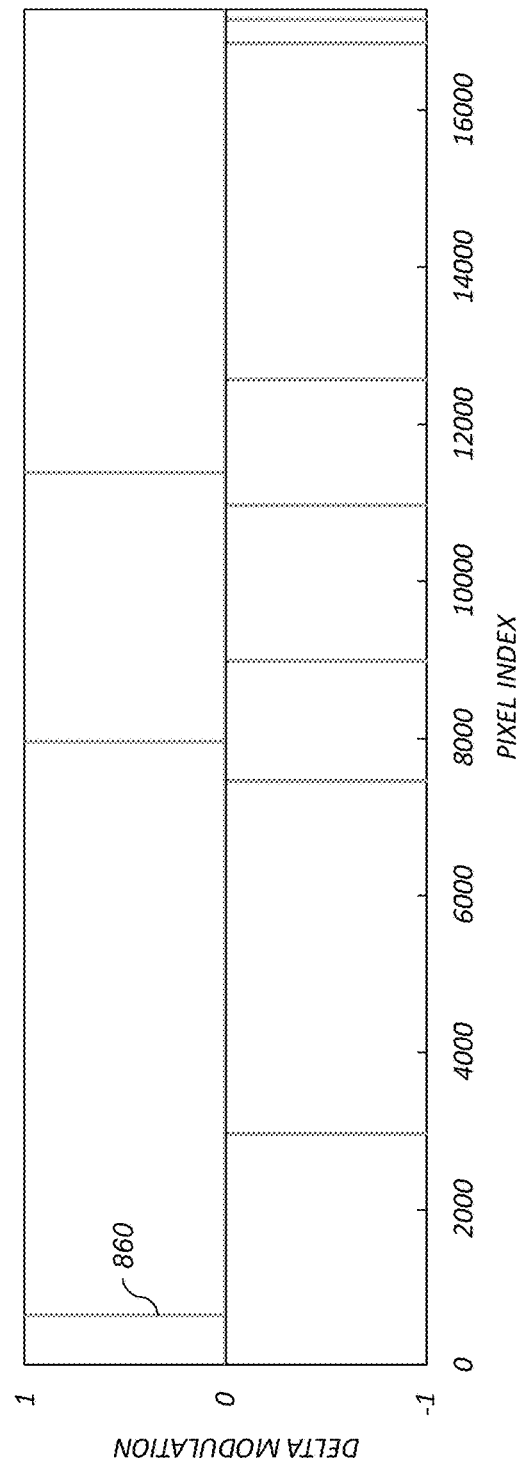
FIG. 16C illustrates an exemplary in-track position correction function representation corresponding to the in-track position correction function of FIG. 16B.

A representation of the in-track position correction function 855 can be stored in a digital memory in any appropriate format to be used in the correction of digital image data. For example, the full in-track position correction function 855 can be stored in the digital memory, either in a quantized form such as that illustrated in FIG. 16B, or in an unquantized form. Alternatively, the in-track position correction function 855 can be represented in other formats. For example, the quantized in-track position correction function 855 of FIG. 16B can be fully represented by storing the differences between the quantized position correction values at sequential pixel positions. An example of such an in-track position correction function representation 860 is illustrated in FIG. 16C. The in-track position correction function representation 860 can be stored in digital memory in a variety of encoding formats. For example, the differences (i.e., which can also referred to as the "transition direction" or the "delta modulation values") can be stored as a function of pixel index. Alternatively, the cross-track positions and transition directions (i.e., the delta modulation values) of the transitions where the quantized position correction values change (i.e., the pixel indices having non-zero delta modulation values) can be stored in a table such as that shown in Table 2.

TABLE 2

In-track position correction function representation.

| Pixel Index | Delta Modulation Value |
|---|---|
| 645 | 1 |
| 2966 | −1 |
| 7458 | −1 |
| 7953 | 1 |
| 8995 | −1 |
| 10971 | −1 |
| 11396 | 1 |
| 12577 | −1 |
| 16854 | −1 |
| 17172 | −1 |

Once the in-track position correction function 855 has been determined, the image lines of a digital image can be modified to determine corrected image lines responsive to the stored in-track position correction function. In a preferred embodiment, the image lines are shifted in the in-track direction, where the amount of the shift varies as a function of cross-track position in accordance with the in-track position correction function 855.

Figure 17:
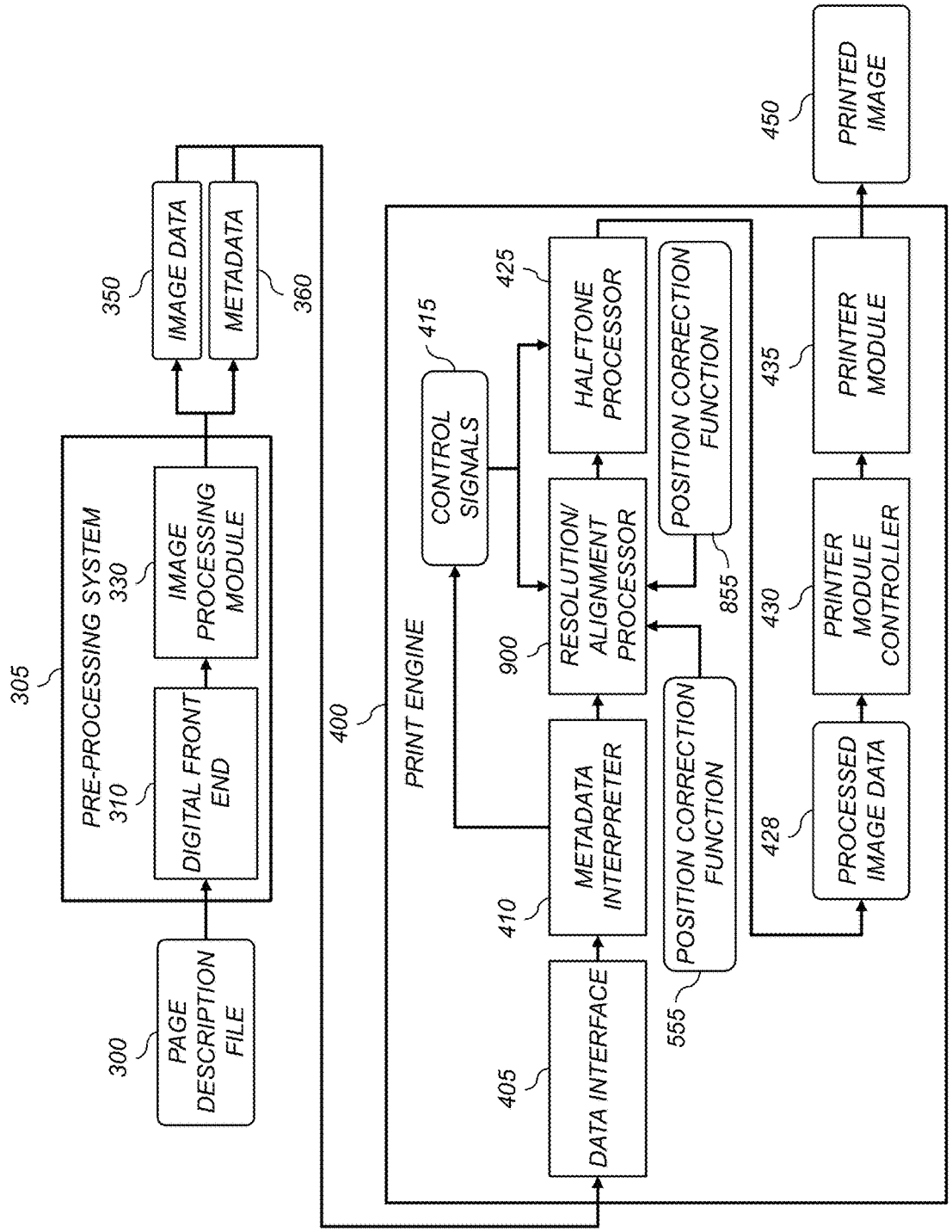
FIG. 17 shows an improved processing path including a print engine that is adapted to produce printed images incorporating in-track position corrections in accordance with an exemplary embodiment.

FIG. 17 shows an improved processing path including a print engine that is adapted to produce printed images incorporating cross-track position corrections in accordance with an exemplary embodiment. The improved processing path is analogous to the processing path of FIG. 11 except that the resolution/alignment pocessor 600 has been replaced by a new resolution/alignment pocessor 900, which corrects the alignment responsive to both the cross-track position correction function 555 and the in-track position correction function 855 in addition to performing any resolution modifications specified by the control signals 415.

Figure 18:
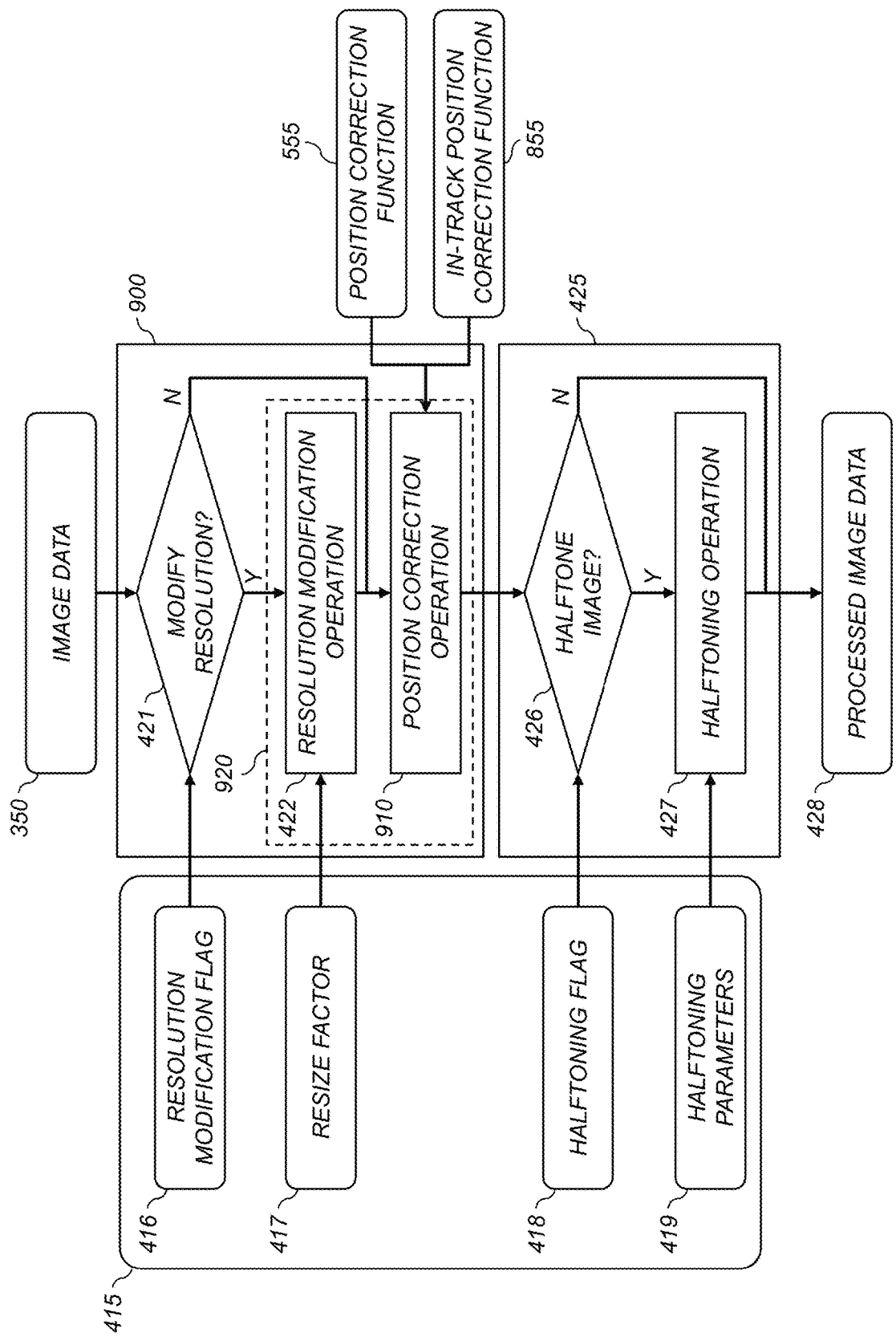
FIG. 18 shows additional details for the resolution/alignment processor and the halftone processor of FIG. 17.

FIG. 18 shows additional details for the resolution/alignment pocessor 900 and the halftone pocessor 425 of FIG. 17. This process is similar to that of FIG. 12 except for position correction operation 910, which applies both the cross-track position correction function 555 and the in-track position correction function 855. As discussed earlier, the resolution modification operation 422 involves resampling the image data 350 in accordance with a resize factor. The position correction operation 910 also involves a resampling of the image data. In an exemplary embodiment, the resolution modification operation 422 and the position correction operation 910 can be combined into a single unified resampling operation 920 rather than two sequential resampling operations.

In an exemplary embodiment, the unified resampling operation 920 works by first performing the cross-track resizing and position correction operation using the process that was described earlier with respect to FIG. 13. An in-track resizing operation is then performed by replicating the processed lines to provide buffered image lines at output resolution. An in-track position correction operation is then performed in which the output image lines are determined by resampling the buffered image lines in accordance with the in-track position correction function 855, which is preferably expressed in terms of the number of output pixels that the image data should be shifted as a function of cross-track position.

Figure 19:
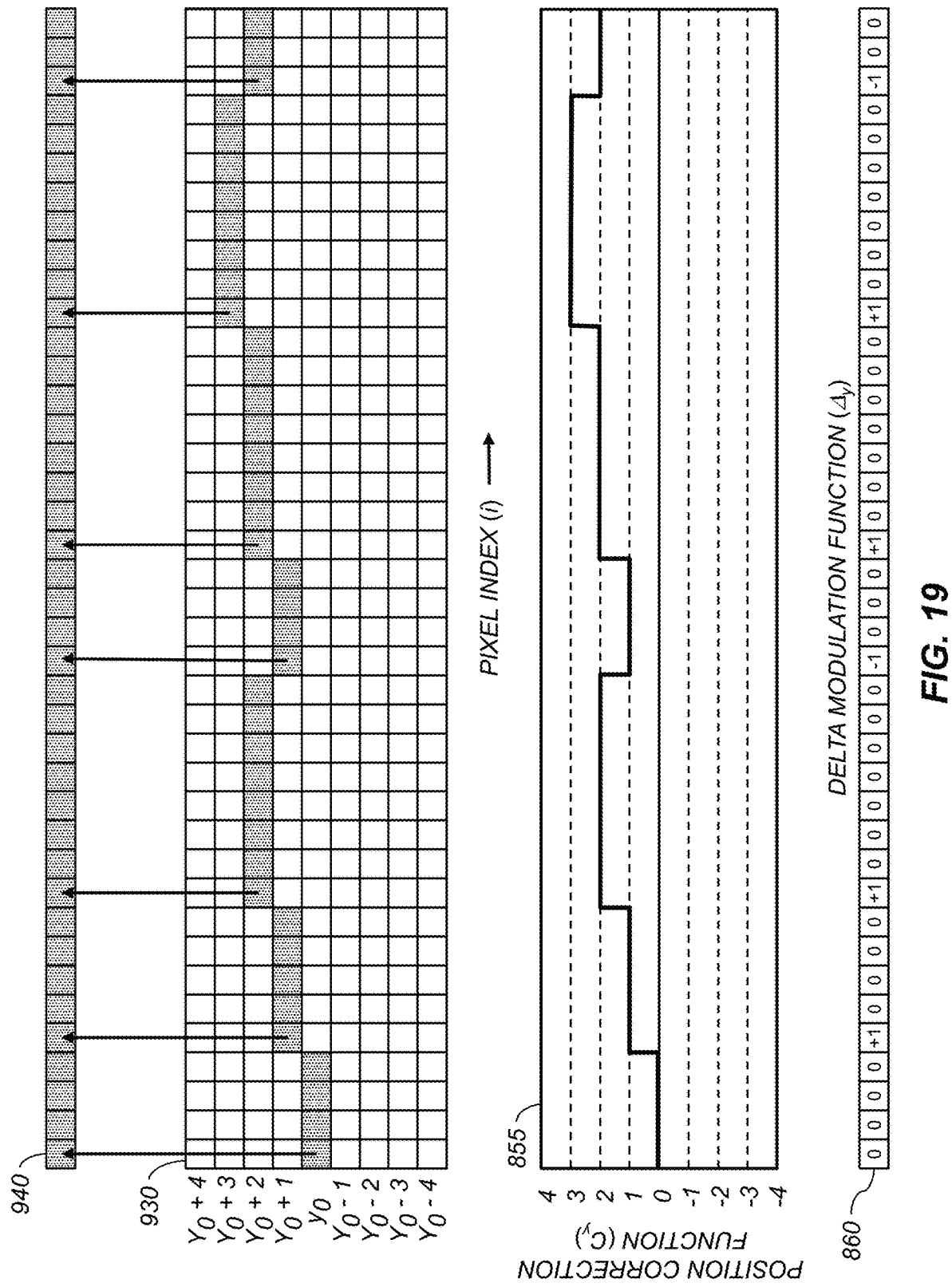
FIG. 19 illustrates an exemplary in-track position correction operation.

An exemplary embodiment of the in-track position correction operation is illustrated in FIG. 19, which shows an image buffer 930 containing nine image lines, where the center image line corresponds to the nominal image for a particular in-track position $y_0$. (Note that, for purposes of illustration, the image lines in this example are shortened relative to real image lines which can have as many as 17,000 pixels or more.) For each cross-track pixel index i, the image buffer 930 is sampled at a shifted in-track position $y_i$ given by:

$$y_i = y_0 + C_y(i) \quad (1)$$

where $C_y(i)$ is the value of the in-track position correction function 855 evaluated at the $i^{th}$ pixel index. The shaded pixel positions in the image buffer 930 indicate the selected pixel positions corresponding to the exemplary in-track position correction function 855. The pixel values at these pixel positions are copied into the output image line 940. For the case where a delta modulation function is used as an in-track position correction function representation 860, the shifted in-track position $y_i$ for each cross-track pixel index can be determined by incrementing the shifted in-track position for the previous cross-track pixel index by the in-track delta modulation value for that cross-track pixel index $$y_{i+1} = y_i + \Delta_y(i+1) \quad (2)$$

where $\Delta_y(i)$ is the in-track delta modulation value for the $i^{th}$ cross-track pixel index.

The image buffer 930 should include at least as many image lines that are needed to cover the largest expected range of corrections for the in-track position correction function 855. After each output image line 940 is processed, the image lines in the image buffer 930 are shifted up and a new image line is added to the bottom of the image buffer 930. In an alternate embodiment, the image buffer 930, can store the entire image. This makes it unnecessary to perform the image line shifting operations, but requires a much larger amount of memory which may be impractical in many systems.

For cases where an in-line resize factor of 2× or more is used, there will be redundant image lines in the image 930, which is an inefficient use of the buffer memory. In such cases, it can be advantageous to integrate the in-track resizing operation with the in-track position correction operation. In an exemplary embodiment, the image buffer can be used to store the image lines before the in-track resizing operation is performed. The image line index for each pixel position $y_i$ can be determined as before corresponding to the output image resolution and can be mapped to a corresponding image line $\hat{y}_i$ in the image buffer containing the pre-in-track resizing image lines:

$$\hat{y}_i = Int(y_i/M) \quad (3)$$

where M is the resize factor 417 and Int(·) is a function that returns the integer portion of a number. (Note that the same resizing factor will typically be used in both the in-track and cross-track directions, although this is not a requirement.)

As discussed earlier, in some embodiments the in-track position correction functions 855 for each color channel can be determined relative to a reference color channel so that they will not only correct for the skew of the individual color channels, but will also account for color-to-color registration errors. In other cases, the overall color-to-color registration errors can be performed separately, for example by introducing a time delay in the printing operation for the non-reference color channels corresponding to an overall shift that is detected between the color channels.

In some embodiments, the printer 100 (FIG. 1) includes an image capture system which can be used to capture images of the printed test target 810 on an appropriate imaging surface as discussed earlier. In such cases, the calibration method of FIG. 14 can be performed automatically without the need for a user to manually handle the printed test target 810. The calibration method can be performed at predefined intervals, or can be initiated by a user when it is observed that the printer is producing printed images having objectionable in-track position errors.

Figure 20:
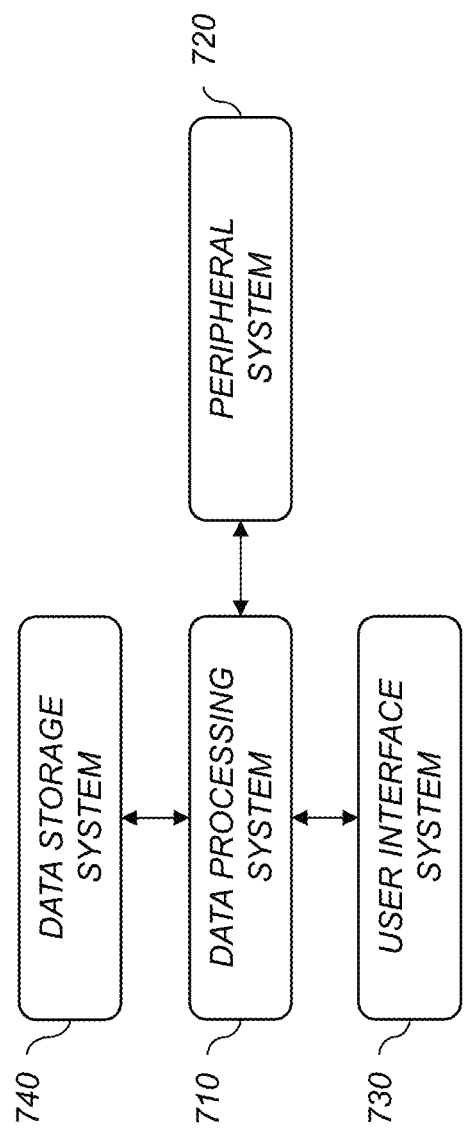
FIG. 20 is a high-level diagram showing the components of a system for processing images in accordance with the present invention.

FIG. 20 is a high-level diagram showing the components of a system for processing image data according to embodiments of the present invention. The system includes a data processing system 710, a peripheral system 720, a user interface system 730, and a data storage system 740. The peripheral system 720, the user interface system 730 and the data storage system 740 are communicatively connected to the data processing system 710.

The data processing system 710 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise. In some embodiments, the data processing system 710 a plurality of data processing devices distributed throughout various components of the printing system (e.g., the pre-processing system 305 and the print engine 370).

The data storage system 740 includes one or more processor-accessible digital memories configured to store information, including the information needed to execute the processes of the various embodiments of the present invention, including the example processes described herein. The data storage system 740 may be a distributed processor-accessible memory system including multiple processor-accessible digital memories communicatively connected to the data processing system 710 via a plurality of computers or devices. On the other hand, the data storage system 740 need not be a distributed processor-accessible digital memory system and, consequently, may include one or more processor-accessible digital memories located within a single data processor or device.

The phrase "processor-accessible digital memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 740 is shown separately from the data processing system 710, one skilled in the art will appreciate that the data storage system 740 may be stored completely or partially within the data processing system 710. Further in this regard, although the peripheral system 720 and the user interface system 730 are shown separately from the data processing system 710, one skilled in the art will appreciate that one or both of such systems may be stored completely or partially within the data processing system 710.

The peripheral system 720 may include one or more devices configured to provide digital content records to the data processing system 710. For example, the peripheral system 720 may include digital still cameras, digital video cameras, cellular phones, or other data processors. The data processing system 710, upon receipt of digital content records from a device in the peripheral system 720, may store such digital content records in the data storage system 740.

The user interface system 730 may include a mouse, a keyboard, another computer, or any device or combination of devices from which data is input to the data processing system 710. In this regard, although the peripheral system 720 is shown separately from the user interface system 730, the peripheral system 720 may be included as part of the user interface system 730.

The user interface system 730 also may include a display device, a processor-accessible memory, or any device or combination of devices to which data is output by the data processing system 710. In this regard, if the user interface system 730 includes a processor-accessible memory, such memory may be part of the data storage system 740 even though the user interface system 730 and the data storage system 740 are shown separately in FIG. 20.

A computer program product for performing aspects of the present invention can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The inventive method for correcting cross-track and in-track position errors has been described within the context of electrophotographic printer 100 (FIG. 1) that utilize a linear printhead having a linear array of light sources for exposing a photoreceptor 206 (FIG. 2). It will be obvious to one skilled in the art that the method can equivalently be used to correct cross-track and in-track position errors in other types of digital printers that include a linear array of light sources, such as printers that are used to write on other types of photosensitive media (e.g., a printer for exposing silver halide photographic paper). The method could similarly be used to correct in-track and cross-track position errors associated with other types of linear printheads such as inkjet printheads that include a linear array of jetting nozzles for ejecting drops of ink onto a receiver media.

The invention has been described in detail with particular reference to certain preferred embodiments thereof, but it will be understood that variations, combinations, and modifications can be effected by a person of ordinary skill in the art within the spirit and scope of the invention.

PARTS LIST 31 printing subsystem
32 printing subsystem
33 printing subsystem
34 printing subsystem
35 printing subsystem
38 print image
39 fused image
40 supply unit
42 receiver
42a receiver
42b receiver
50 transfer subsystem
60 fuser module
62 fusing roller
64 pressure roller
66 fusing nip
68 release fluid application substation
69 output tray
70 finisher
81 transport web
86 cleaning station
99 logic and control unit (LCU)
100 printer
111 imaging member 112 intermediate transfer member
113 transfer backup member
201 first transfer nip
202 second transfer nip
206 photoreceptor
210 charging subsystem
211 meter
212 meter
213 grid
216 surface
220 exposure subsystem
225 development station
226 toning shell
227 magnetic core
240 power source
300 page description file
305 pre-processing system
310 digital front end (DFE)
315 raster image processor (RIP)
320 color transform processor
325 compression processor
330 image processing module
335 decompression processor
340 halftone processor
345 image enhancement processor
350 image data
360 metadata
370 print engine
400 print engine
405 data interface
410 metadata interpreter
415 control signals
416 resolution modification flag
417 resize factor
418 halftoning flag
419 halftoning parameters
420 resolution modification processor
421 modify resolution test
422 resolution modification operation
425 halftone processor
426 halftone image test
427 halftoning operation
428 processed image data
430 printer module controller
435 printer module
450 printed image
460 light source
465 light source chip
466 connection pad
470 light source tile
475 printhead
500 test target
505 print test target step
510 printed test target
515 capture image step
520 captured image
525 analyze captured image step
526 combined image trace
527 alignment mark profile
528 idealized profile function
530 measured alignment mark positions
535 reference alignment mark positions
540 determine cross-track position errors step
545 cross-track position errors
546 cross-track position error function
547 quantized cross-track position error function
550 determine position correction function step
555 position correction function
560 position correction function representation
570 alignment marks
575 solid patches
580 first color channel image content
581 second color channel image content
582 third color channel image content
583 fourth color channel image content
590 cross-track direction
595 in-track direction
600 resolution/alignment processor
610 position correction operation
620 unified resampling operation
630 input pixel
635 pixel index
640 determine delta modulation step
645 delta modulation value
650 adder
670 repeat value
675 repeat input pixel step
680 output pixels
710 data processing system
720 peripheral system
730 user interface system
740 data storage system
800 test target
805 print test target step
810 printed test target
815 capture image step
820 captured image
825 analyze captured image step
830 measured in-track alignment mark positions
835 reference in-track alignment mark positions
840 determine in-track position errors step
845 in-track position errors
846 in-track position error function
847 quantized in-track position error function
850 determine in-track position correction function step
855 in-track position correction function
860 in-track position correction function representation
870 in-track alignment marks
900 resolution/alignment processor
910 position correction operation
920 unified resampling operation
930 image buffer
940 output image line

The invention claimed is:

1. A method for correcting in-track position errors in a digital printing system having a linear printhead, the linear printhead extending in a cross-track direction and including an array of light sources for exposing a photosensitive medium, comprising:
   a) providing digital image data for a test target including a plurality of alignment marks positioned at predefined cross-track positions;
   b) printing the test target using the digital printing system to provide a printed test target;
   c) using a digital image capture system to capture an image of the printed test target;
   d) using a data processing system to automatically analyze the captured image to determine a measured in-track position for each of the alignment marks;
   e) comparing the measured in-track positions for the alignment marks to reference in-track positions to determine measured in-track position errors;
   f) determining an in-track position correction function responsive to the measured in-track position errors, wherein the in-track position correction function specifies in-track position corrections to be applied as a function of cross-track position;

g) storing a representation of the in-track position correction function in a digital memory;

h) receiving digital image data for a digital image to be printed by the digital imaging system, wherein the digital image includes a plurality of image lines extending in the cross-track direction; and i) determining corrected image lines by resampling the digital image data responsive to the stored representation of the in-track position correction function;

wherein the in-track position correction function is quantized to integer in-track position corrections; and wherein the representation of the in-track position correction function stored in the digital memory includes the cross-track positions and transition direction of transitions in the quantized in-track position correction function.

2. The method of claim 1, wherein the digital printing system includes a plurality of color channels, wherein one of the color channels is designated to be a reference color channel and the other color channels are designated to be non-reference color channels, and wherein the reference positions for the alignment marks for the non-reference color channels are determined responsive to the measured positions of one or more alignment marks printed with the reference color channel.

3. The method of claim 2, wherein a predefined color channel is designated to be the reference color channel.

4. The method of claim 1, wherein the reference positions correspond to ideal positions of the alignment marks.

5. The method of claim 1, wherein the printed test target is on a print medium, and wherein the digital image capture system captures an image of the printed test target on the print medium.

6. The method of claim 1, wherein the printed test target is on an imaging surface, the imaging surface being a surface of a photoconductor, a surface of an intermediate transfer member or a surface of a transport web, and wherein the digital image capture system captures an image of the printed test target on the imaging surface.

7. The method of claim 1, wherein the plurality of alignment marks includes at least ten alignment marks.

8. The method of claim 1, wherein the light sources of the linear printhead are LED light sources.

9. The method of claim 1, wherein the resampling of the digital image data is also responsive to a resize factor.

10. The method of claim 1, wherein the digital image capture system is a component of the digital printing system.

11. The method of claim 1, further comprising: printing the corrected image lines using the digital printing system to provide a printed image with reduced in-track position errors.

* * * * *